United States Patent
Takeuchi et al.

[11] Patent Number: 5,841,926
[45] Date of Patent: Nov. 24, 1998

[54] OPTICAL FIBERS FOR OPTICAL ATTENUATION

[75] Inventors: Yoshiaki Takeuchi; Ryo Nagase; Seiko Mitachi, all of Mito; Yuichi Morishita, Yokohama; Akira Kumagai; Yumi Ariga, both of Kanagawa; Kenichi Muta, Kawasaki; Kazunari Sugi, Kanagawa; Masashi Saijo, Saitama, all of Japan

[73] Assignees: Nippon Telegraph and Telephone Corporation; Showa Electric Wire & Cable Co., Ltd., both of Japan

[21] Appl. No.: 777,205

[22] Filed: Dec. 27, 1996

[30] Foreign Application Priority Data

Jan. 4, 1996 [JP] Japan .................................. 8-000004
May 22, 1996 [JP] Japan .................................. 8-126633

[51] Int. Cl.⁶ ........................................ G02B 6/02
[52] U.S. Cl. .................................. 385/123; 385/140
[58] Field of Search .................. 385/123–128, 385/140–145

[56] References Cited

U.S. PATENT DOCUMENTS 4,610,506  9/1986  Tokunaga et al. ................ 385/128
5,509,101  4/1996  Gilliland et al. ............. 385/123 X

FOREIGN PATENT DOCUMENTS 5264816  3/1992  Japan .
6109923  9/1992  Japan .
5089784  4/1993  Japan .
5267710  6/1997  Japan .

*Primary Examiner*—Phan T.H. Palmer
*Attorney, Agent, or Firm*—Lorusso & Loud

[57] ABSTRACT

Disclosed are optical fibers for optical attenuation comprising a core and a cladding, wherein the cladding comprises two or more parts different from each other in their refractive indices and/or the attenuating dopant existence. By using the optical fibers for optical attenuation of the present invention, an optical attenuator which can effectively reduce the effect of cladding mode upon coupling of optical fibers and is excellent in characteristic stability can be manufactured at a low cost.

26 Claims, 7 Drawing Sheets

FIG.1
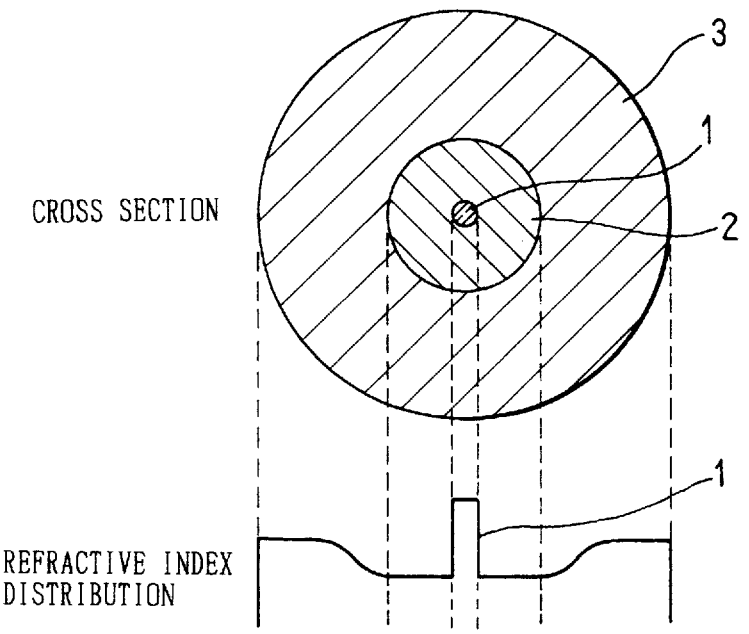
REFRACTIVE INDEX DISTRIBUTION
FIG. 1a
1: CORE
2: INNER CLADDING
3: OUTER CLADDING
FIG.2
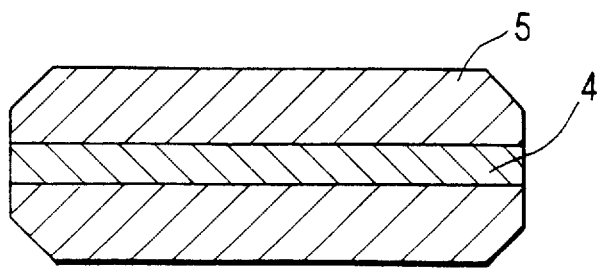
4: OPTICAL FIBER FOR OPTICAL ATTENUATION
5: ZIRCONIA FERRULE

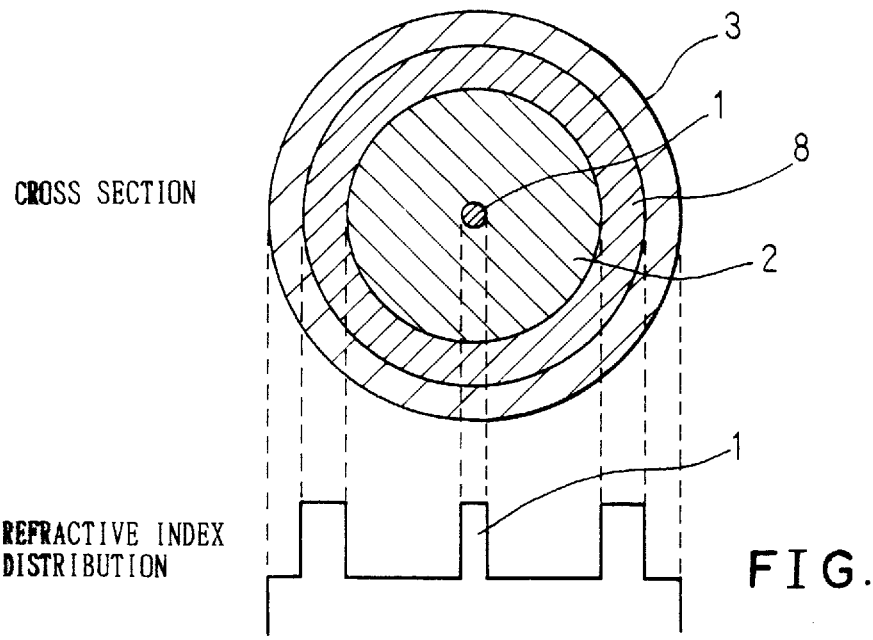
FIG. 6
FIG. 6a
8: INTERMEDIATE CLADDING
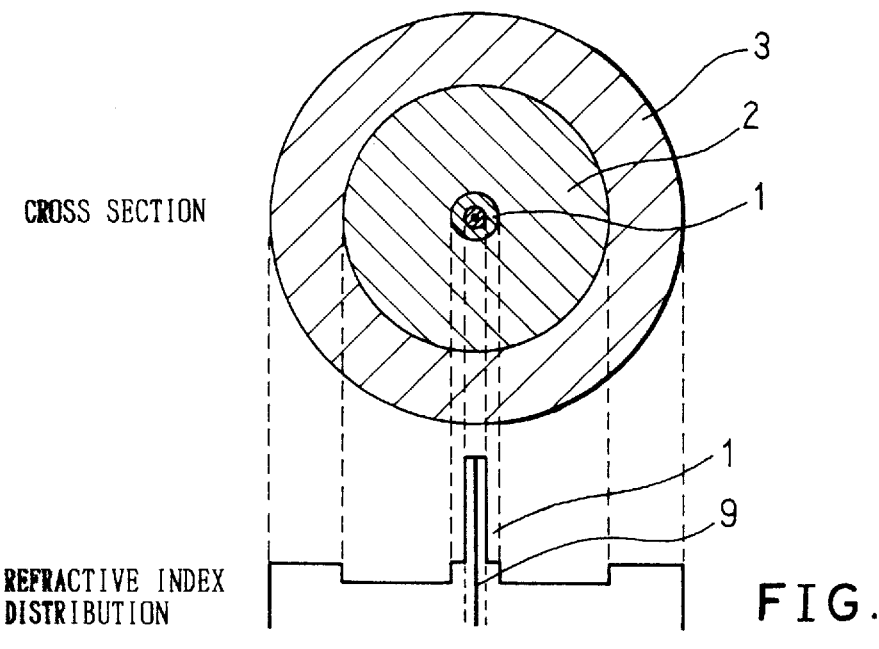
FIG. 7
FIG. 7a
9: CORE CENTER PART

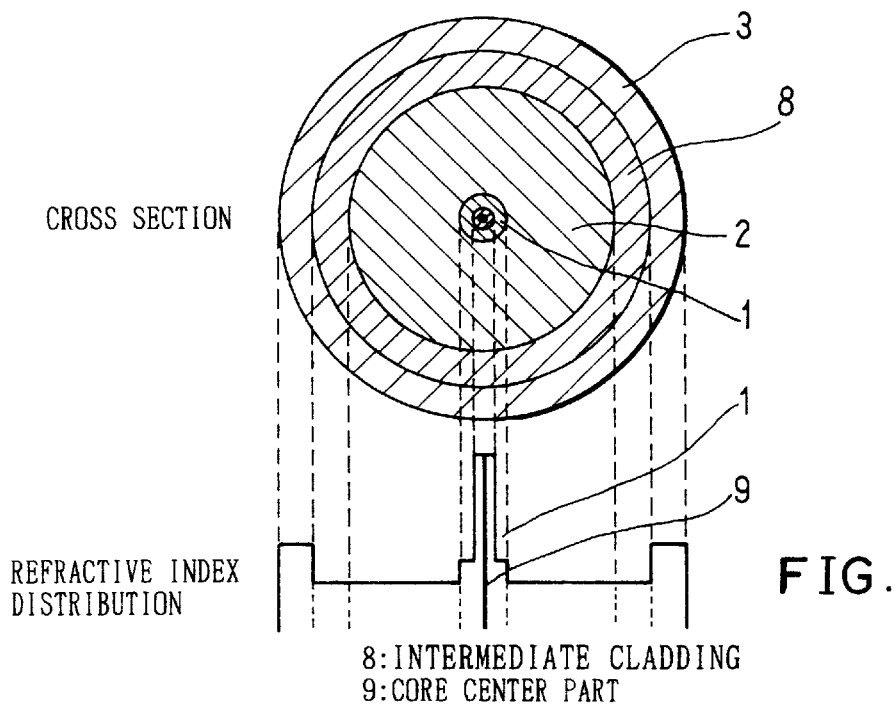
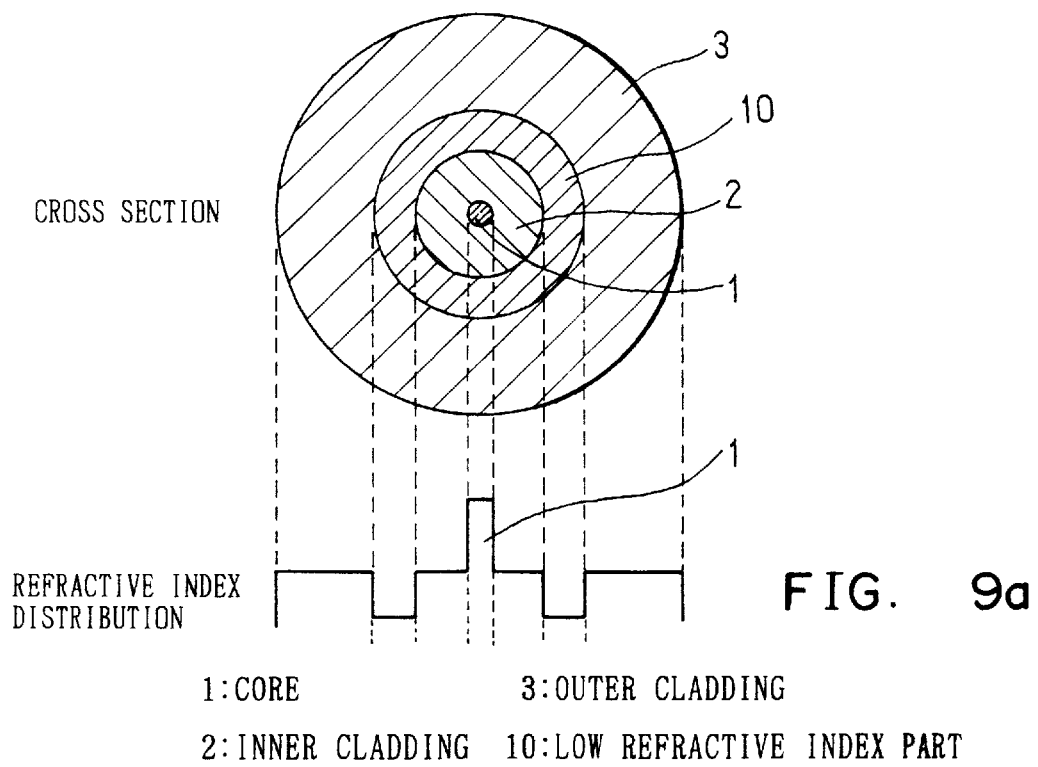

FIG. 10
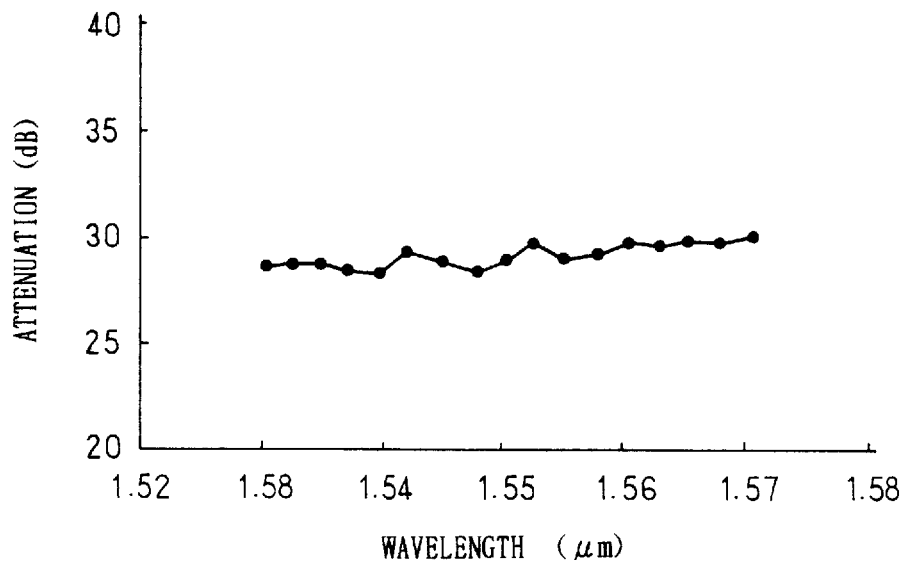
FIG. 11
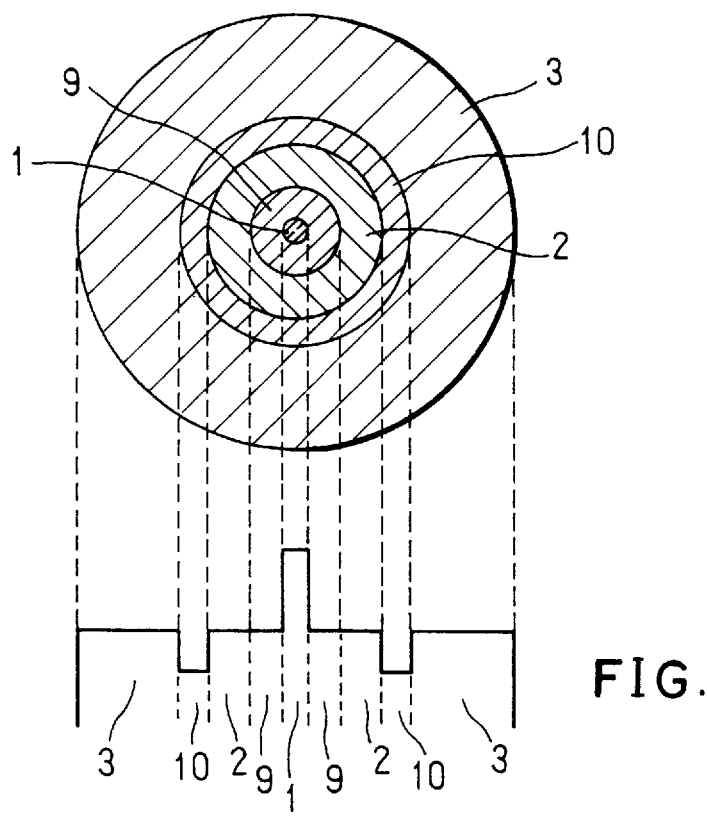
FIG. 11a
9: OPTICAL ATTENUATION DOPANT REGION

OPTICAL FIBERS FOR OPTICAL ATTENUATION

BACKGROUND OF THE INVENTION

1. Field of the Invention

The present invention relates to an optical fiber for optical attenuation. In particular, the present invention relates to an optical attenuator used for attenuating intensity of optical signals at a constant rate, which is used in the fields of optical communication, optical instrumentation, CATV system and the like, and an optical fiber for optical attenuation used for the optical attenuator.

2. Related Art

Though several methods for attenuating optical signals by a certain degree by means of an optical attenuator using an optical fiber have hitherto been proposed, it is still required to develop a stable optical attenuator for high attenuation bearable to a high input power. As a method for attenuation which can be used for such an optical attenuator for high attenuation, there have been known a method using interposal of filters between optical fibers and a method using addition of optical attenuation dopant into optical fibers. Of these, the method using addition of optical attenuation dopant is considered advantageous because of ease of assembling an attenuator using such optical fibers, high reliability, low cost and the like. This technique is disclosed in, for example, Japanese Patent Application Unexamined Publication Nos. Sho 54-2754, Hei 6-303156, Japanese Utility Model Application Unexamined Publication Nos. Sho 63-96504, 63-96506 and the like.

Examining such prior techniques as mentioned above, the present inventors found the following problems.

A fixed attenuator is usually used by coupling optical fibers to its both ends or one end. At the coupled point, a little part of optical signals would be radiated into a cladding because of mismatch of cores of the coupled optical fibers and difference of mode field. In coupling of optical fibers of standard type, such cladding mode is extremely small relative to intensity of optical signals propagated in the core and therefore it may be considered substantially extinct during the propagation in the optical fibers.

However, the present inventors confirmed that, because optical fibers used in fixed optical attenuators having such a structure as described above are short in their length and fixed linearly, the cladding mode generated at the coupling point of the input end is likely to propagate to the output end of the fixed attenuator and to be imode-coupled again into a core of optical fiber coupled at the coupling point of the output end.

Though measured values would vary depending on the measurement conditions, propagation loss of cladding mode was about 40 dB including coupling loss upon re-coupling according to the present inventors' measurement. If the optical fiber is relatively long and shows curvature, that value would further be reduced and therefore the propagation of cladding mode can be neglected for coupling of ordinary optical fibers. Further, such propagation of cladding mode can be considered to cause no practical problem in an attenuator of 10 dB or less even though it is a fixed optical attenuator.

However, in the case of a fixed attenuator for high attenuation, because difference of intensities of the attenuated signals propagated in the core and cladding mode becomes relatively small, wavelength dependent beat of the attenuation is observed and attenuation magnitude would become unstable. Thus, problems would be occur, for example, optical signals could not be properly propagated.

In the above, it is assumed that shape of propagation mode field of the optical fiber used for the fixed attenuator and that of the optical fibers to be coupled are substantially the same. However, if they are different, relative intensity of the light radiated in the cladding is further increased and it is evident that such problems as mentioned above would occur even in a fixed attenuator for attenuation of 10 dB or less. Further, if the positional mismatch of the coupled cores is significant, the same problems would occur even though the shapes of mode field are substantially the same.

In addition, influence of cladding mode is explained in the above for an optical attenuator using an optical fiber for optical attenuation. However, as described in Japanese Patent Application Unexamined Publication No. 6-109923, the problem of cladding mode would be seen not only for the case where an optical fiber for optical attenuation was used, but also broadly seen for optical attenuators in a generic sense.

Methods for overcoming this problem have been suggested in Japanese Patent Application Unexamined Publication Nos. 5-264816, 6-109923 and the like. These methods use attenuating optical fibers where the cladding is made of attenuating medium. However, because an attenuating dopant should be added throughout the cladding of the optical fiber used for these methods, they suffer from a problem that optical fibers for optical attenuation should become expensive. For an optical fiber for high attenuation, a correspondingly larger amount of attenuation dopant is needed. However, it is technically difficult to add the dopant uniformly with such a high content and thus optical fibers for optical attenuation again become expensive.

As described in Japanese Patent Application Unexamined Publication No. 6-109923, when attenuation in the cladding should be higher than in the core, the dopant content should be further increased and hence the cost of optical fibers for optical attenuation becomes even higher. In addition, it is very difficult to add the dopant throughout the cladding at a concentration higher than that used in the core.

With respect to optical attenuation characteristics, when the whole cladding is made of an attenuating medium, the wavelength dependency of attenuation degree should greatly depend on the characteristic of the attenuation dopant. Because absorption spectrum of such a dopant usually vary depending on the wavelength, the optical attenuation characteristics should vary depending on the wavelength of optical signals.

Therefore, there has been a problem that manufacture of an optical attenuator of this structure usable at two or more multiple wavelengths is more difficult than that of conventional optical attenuator. This problem may be overcome by, for example, adding two or more kinds of attenuating materials to the cladding to offset the wavelength dependency of dopants. However, it is technically difficult to add two or more kinds of attenuating materials to the cladding so that the wavelength dependency of the dopants should be offset and it is inevitably accompanied by increased cost of optical fibers for optical attenuation.

One of the problems commonly observed in the methods where an attenuating dopant is added throughout the cladding is increase of refractive index due to the addition of attenuating dopant. With increase of refractive index of the cladding, it is necessary to increase refractive index of the core correspondingly and therefore it is necessary to increase the amount of dopant for elevating refractive index to control relative refractive-index difference. Furthermore, if the refractive indices of the core and the cladding were excessively increased, there may be relative refractive-index difference between the attenuating optical fiber and ordinary optical fiber, and it undesirable leads increased reflection of optical signals at coupling points of optical fibers and an optical attenuator to deteriorate the basic performance of the optical attenuator.

Therefore, the object of the present invention is to provide a technique for reducing the effect of cladding mode upon coupling of optical fibers and providing an optical attenuator excellent in characteristic stability with a low cost.

Other objects of the present invention and novel characteristics thereof will become apparent from the following descriptions and the appended drawings.

SUMMARY OF THE INVENTION

According to the first embodiment of the present invention, there is provided an optical fiber for optical attenuation consisting of a core and a cladding surrounding the core and having a refractive index lower than that of the core within at least a part of the cladding in the vicinity of the core, the core or the part of the cladding in the vicinity of the core comprising a dopant for attenuating optical signals, wherein the optical fiber comprises, in addition to the part in the vicinity of the core, a high refractive index part of the cladding having a refractive index higher than that of the part of the cladding in the vicinity of the core.

In the above optical fiber, a part or the whole of the high refractive index part of the cladding may be doped with a dopant for attenuating optical signals.

According to the second embodiment of the present invention, there is provided an optical fiber for optical attenuation consisting of a core and a cladding surrounding the core and having a refractive index lower than that of the core within at least a part of the cladding in the vicinity of the core, the core or the part of the cladding in the vicinity of the core comprising a dopant for attenuating optical signals, wherein the optical fiber comprises a part, other than the part in the vicinity of the core, containing a dopant for attenuating optical signals.

The optical fibers of the first and second embodiments described above are characterized mainly in that a part for trapping optical signals propagated in the cladding is provided in the cladding at a position sufficiently separated from the core as a structural component of optical fiber for optical attenuation to prevent the optical signals propagated in the cladding from re-coupling with the core.

In conventional fixed attenuators, the cladding has no attenuating property or the whole cladding has attenuating property. Therefore, such a structure as described above, where a part for trapping optical signals propagated in the cladding is provided in the cladding at a position sufficiently remote from the core, has not been known. The present inventors confirmed that cladding mode detrimental for an optical attenuator is basically not a mode trapped in the vicinity of the core, but a mode reaching a part of the cladding sufficiently remote from the core. The present invention has been completed based on this finding. Further, it has also been confirmed that the cladding mode can be sufficiently reduced only by providing a part for trapping cladding mode at a part of the cladding sufficiently remote from the core.

According to the third embodiment of the present invention, there is provided an optical fiber for optical attenuation consisting of a core and a cladding surrounding the core and having a refractive index lower than that of the core within at least a part of the cladding in the vicinity of the core, wherein the cladding comprises an inner cladding and a low refractive index part surrounding the inner cladding and having a refractive index lower than that of the inner cladding and the core and a part or the whole of the inner cladding contains a dopant for attenuating optical signals.

In the optical fiber of the third embodiment of the invention, because of the dual structure of the cladding comprising the inner cladding and the low refractive index part having a refractive index lower than that of the inner cladding, optical signals leaked from the core to the cladding is confined within the inner cladding.

On the other hand, because of the structure where the core and a part or the whole of the inner cladding contains a dopant for attenuating optical signals, optical signals generated upon coupling and confined within the inner cladding can be attenuated and hence the influence of cladding mode can be reduced.

The optical fibers for optical attenuation of the first to third embodiments of the present invention commonly use a cladding comprising two or more parts different in their refractive indices and/or the attenuating dopant existence. However, the optical fibers of the first and second embodiments are different from the one of the third embodiment, since, in the optical fibers of the first and second embodiments, refractive index of the outer cladding is larger than that of the inner cladding, and on the other hand, in the optical fiber of the third embodiment, refractive index of the inner cladding is larger than that of the second cladding. Therefore, their mechanisms dealing with cladding mode are completely different from each other as described below.

That is, in the optical fibers of the first and second embodiments, the effect of cladding mode is reduced by trapping and/or attenuating optical signals propagated in the cladding by means of the outer cladding. On the other hand, in the optical fiber of the third embodiment, the effect of the cladding mode is reduced by confining optical signals propagated in the cladding within the inner cladding and attenuating the signals by means of a dopant doped in the core or a part or the whole of the inner cladding as described above.

BRIEF DESCRIPTION OF THE DRAWINGS

FIG. 1 is a cross-sectional view of an optical fiber for optical attenuation according to the first embodiment of the present invention (Example 1) showing its refractive index distribution.

FIG. 2 shows a structure of zirconia ferrule used for the fixed optical attenuator using the optical fiber according to the first embodiment of the present invention (Example 1).

FIG. 6 is a cross-sectional view of an optical fiber for optical attenuation according to the first embodiment of the present invention (Example 2) showing its refractive index distribution.

FIG. 7 is a cross-sectional view of an optical fiber for optical attenuation according to the second embodiment of the present invention (Example 3) showing its refractive index distribution.

FIG. 8 is a cross-sectional view of an optical fiber for optical attenuation according to the second embodiment of the present invention (Example 4) showing its refractive index distribution.

FIG. 9 is a cross-sectional view of an optical fiber for optical attenuation according to the third embodiment of the present invention (Example 5) showing its refractive index distribution.

FIG. 10 is a graph showing the result of measurement of wavelength dependency of attenuation at 1.55 $\mu$m band for the fixed attenuator of SC type of Example 5.

FIG. 11 is a cross-sectional view of an optical fiber for optical attenuation according to the third embodiment of the present invention (Example 6) showing its refractive index distribution.

BEST MODE FOR CARRYING OUT THE INVENTION

Figure 3:
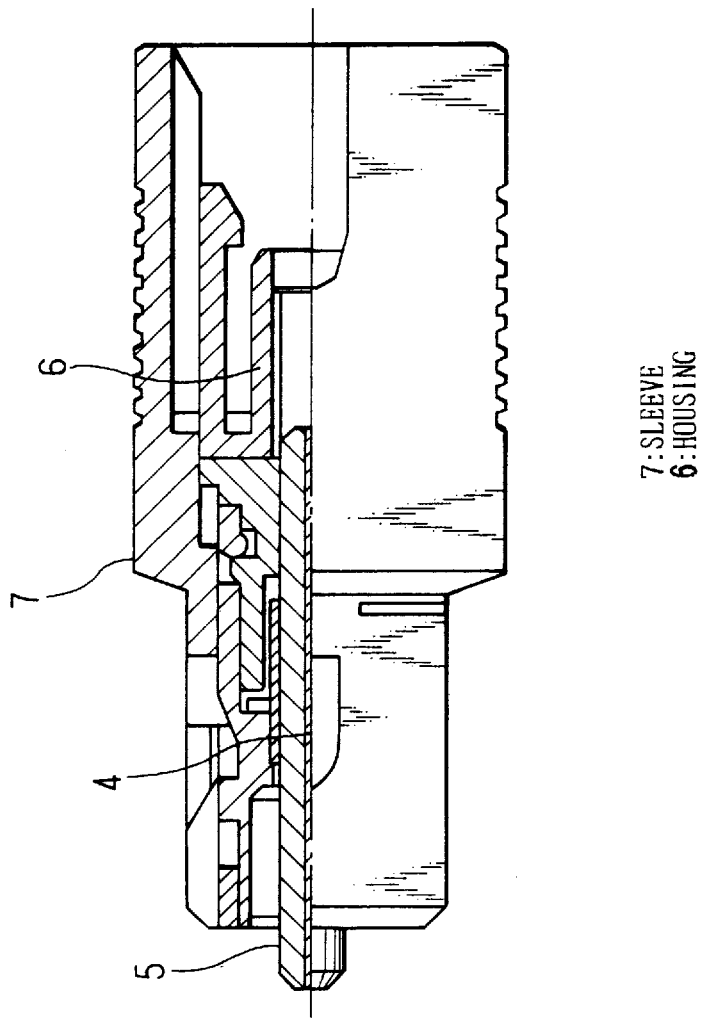
FIG. 3 shows a structure of the optical attenuator of SC type using the optical fiber according to the first embodiment of the present invention (Example 1).

The present invention will be further explained hereinafter by the reference to the following examples and the appended drawings.

First Embodiment

EXAMPLE 1

FIG. 1 is a cross-sectional view of an optical fiber for optical attenuation according to the first embodiment of the present invention (Example 1) showing its refractive index distribution. The optical fiber comprised a core 1 for optical propagation, inner cladding 2 and outer cladding 3, a part for trapping cladding mode. The core 1 was made of quartz glass and doped with $GeO_2$ so that there should be a relative refractive-index difference between the core 1 and the cladding. The relative refractive-index difference between the core and the cladding was 0.3% with the core diameter of 8 $\mu$m. The cutoff wavelength was about 1.1 $\mu$m. The core 1 was further doped with Co (cobalt) so that the intensity of optical signals should be attenuated. As described in Japanese Utility Model Application Unexamined Publication No. Hei 3-61547, Co is an element suitable for optical attenuation at 1.3 $\mu$m and 1.55 $\mu$m wavelength band. The Co content was adjusted so that optical attenuation at a wavelength of 1.31 $\mu$m should be 30 dB with the fiber length of 22.4 mm. The inner cladding 2 was made of pure quartz glass and its outer diameter was about 40 $\mu$m. The outer cladding was doped with $GeO_2$ like the core, and its content was gradually increased from its inner side to outer side and its outer superficial part had such a $GeO_2$ content that a substantially constant relative refractive-index difference of 0.15% should be obtained. The outer diameter of the outer cladding was 125 $\mu$m, similar to that of an optical fiber of standard type. As to the relative refractive-index difference, the cladding was about a half of the core. However, since it was sufficiently remote from the core, optical signals propagated in the core were not affected.

FIG. 2 shows an exemplary structure showing an example of way of use of the optical fiber described above, where the optical fiber is fixed in a zirconia ferrule. In this figure, the optical fiber for optical attenuation 4 manufactured as described above is fixed in a zirconia ferrule 5 having a length of 22.4 mm. A zirconia ferrule is a conventional component for fixing optical fibers. The length of the optical fiber for optical attenuation 4 to be used was defined by the length of the zirconia ferrule 5 and attenuation of optical signals is determined by the length of the optical fiber for optical attenuation 4 and the content of doped Co.

Therefore, if the length of the optical fiber for optical attenuation 4 is not particularly defined, for example, as in the case where single mode optical fibers of standard type were coupled to one or both ends of the optical fiber for optical attenuation 4, fixed attenuators with various attenuation degrees can be manufactured from one kind of the optical fiber for optical attenuation 4 by varying the length of the optical fiber for optical attenuation 4.

FIG. 3 shows an example of fixed attenuator of SC type using the ferrule described above incorporated with the optical fiber for optical attenuation 4. It comprises a sleeve 6 and housing 7. The sleeve 6 is a component for adjusting the center axes of the optical fibers by applying uniform pressure to the ferrule of, for example, cylindrical shape, in its radial direction. The housing 7 is a container for the fixed attenuator of SC type.

Figure 4:
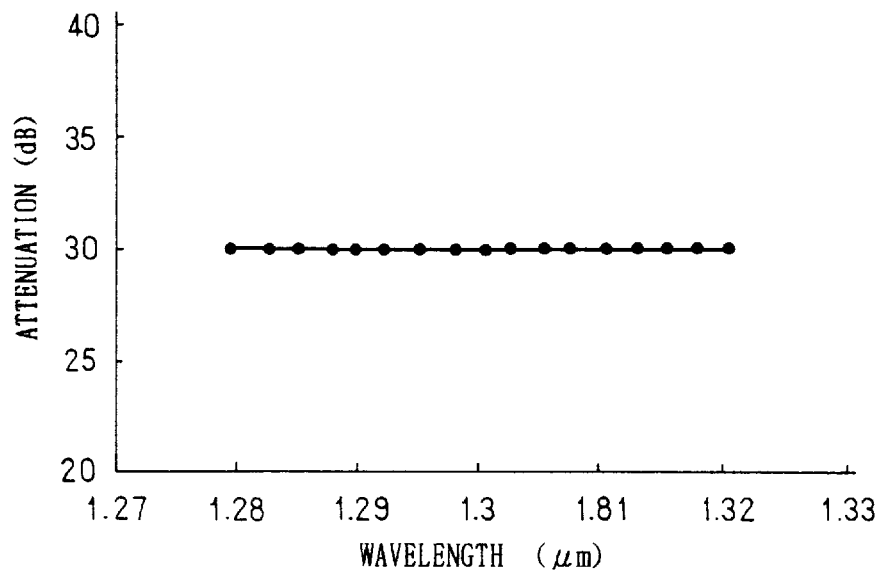
FIG. 4 is a graph showing the result of measurement of wavelength dependency of attenuation at 1.3 $\mu$m band for the first embodiment of the present invention (Example 1).

Using this optical attenuator of SC type comprising single mode optical fibers of standard type coupled to both ends of the optical attenuator, basic characteristics at 1.3 $\mu$m band were measured. Results of the measurement of wavelength dependency of attenuation at 1.3 $\mu$m band are shown in FIG. 4. The attenuation of 30 dB was obtained very stably and no beat of attenuation was observed even though the wavelength was somewhat varied. This was because there was no coupling of optical signals and cladding mode and hence there was no inhibitory factor for optical signal propagation, and indicates that acceptable range at 1.3 $\mu$m band for signal wavelength fluctuation depending on light sources and the like was broad.

Moreover, as a simulation of a condition where cladding mode is likely to occur, a similar test was performed by connecting to the both ends of the attenuator with optical fibers which had been subjected to a dispersing treatment of the core and whose mode field diameter at the end of the connector was increased by 1.5 times. Also in this case, attenuation was stable and it could be confirmed that cladding mode was effectively reduced.

As to manufacturing cost, it is evident that the above optical fiber can be manufactured at a cost lower than the one having a cladding throughout which is doped with an attenuating dopant, because an ordinary process for producing base materials of optical fibers can be used as it is for doping $GeO_2$ into the cladding of the optical fiber for optical attenuation 4 where a part of the cladding is doped with $GeO_2$.

COMPARATIVE EXAMPLE 1

Figure 5:
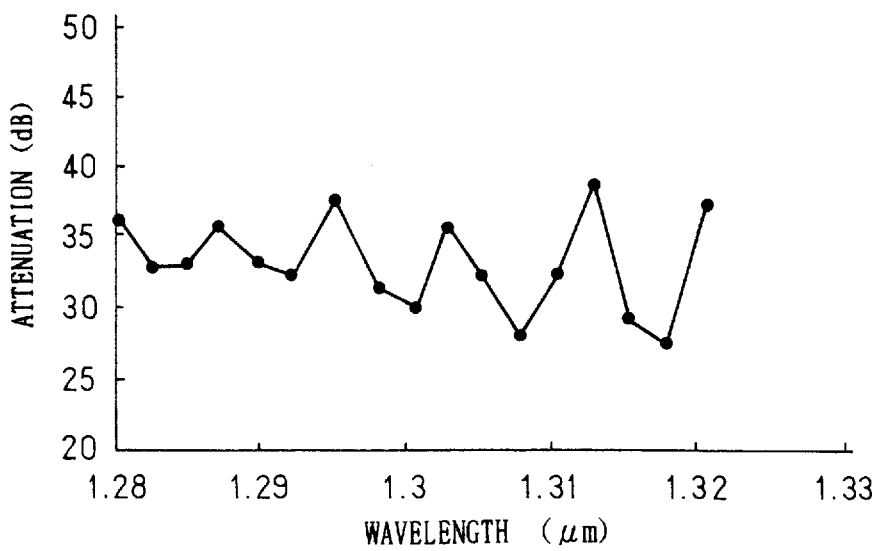
FIG. 5 is a graph showing the result of measurement of wavelength dependency of attenuation at 1.3 $\mu$m band for a comparative example of the first embodiment of the present invention (Example 1).

As a comparative sample for the Example 1 (first embodiment), an optical fiber for optical attenuation of which core had the same structure as the optical fiber of Example 1 and cladding was not doped with $GeO_2$ was prepared and a similar test was performed using the obtained optical fiber. Results of the measurement of wavelength dependency of attenuation at 1.3 $\mu$m band are shown in FIG. 5. As wavelength dependency, the attenuation showed periodically varying beats of a magnitude as large as ±5 dB and thus it was confirmed that attenuation could significantly change by a little change of the wavelength. This difference of the results clearly demonstrated the cladding mode eliminating effect of the optical fiber for optical attenuation of the present invention.

EXAMPLE 2

FIG. 6 is a cross-sectional view of an optical fiber for optical attenuation according to the first embodiment of the present invention (Example 2) showing its refractive index distribution. The optical fiber comprised a core 1 for optical propagation, inner cladding 2, intermediate cladding 8, a part for trapping cladding mode, and outer cladding 3. The core 1 was made of quartz glass and doped with $GeO_2$ so that there should be a relative refractive-index difference between the core and the cladding. The relative refractive-index difference between the core and the cladding was 0.3% with the diameter of the core 1 of 8 $\mu$m. The cutoff wavelength was about 1.1 $\mu$m. The core 1 was doped with V (vandium) so that the intensity of optical signals should be attenuated.

The V content was adjusted so that optical attenuation at a wavelength of 1.31 $\mu$m should be 20 dB with the fiber length of 22.4 mm. The inner cladding 2 and the outer cladding 3 was made of pure quartz glass. The outer diameter of the inner cladding 2 was about 75 $\mu$m and the outer diameter of the outer cladding was 125 $\mu$m, similar to that of an optical fiber of standard type. The intermediate cladding 8 was doped with $GeO_2$ like the core so that a substantially constant relative refractive-index difference of 0.3% should be obtained. The outer diameter of the intermediate cladding 8 was 100 $\mu$m. An optical attenuator of SC type was manufactured as described in Example 1 using this optical fiber for optical attenuation.

Using this optical attenuator of SC type comprising single mode optical fibers of standard type coupled to both ends of the optical attenuator, basic characteristics were measured at 1.3 $\mu$m band. The attenuation was very stable and no beat of attenuation was observed even though the wavelength was somewhat varied.

Second Embodiment

EXAMPLE 3

FIG. 7 is a cross-sectional view of an optical fiber for optical attenuation according to the first embodiment of the present invention (Example 3) showing its refractive index distribution. The optical fiber comprised a core 1 for optical propagation, core center part 9 having optical attenuation property, inner cladding 2, and outer cladding 3, a part for trapping and attenuating cladding mode. The core 1 was made of quartz glass and doped with $GeO_2$ so that there should be a relative refractive-index difference between the core 1 and the cladding. The relative refractive-index difference between the core 1 and the cladding was 0.75% with the mode field diameter of about 8 $\mu$m, similar to that of dispersion shifted optical fibers. The cutoff wavelength was about 1.2 $\mu$m. The core center part 9 of the core 1 was doped with Co so that the intensity of optical signals should be attenuated.

The doped Co content and the doped region (in the core center part) were adjusted so that optical attenuation at both wavelengths of 1.31 $\mu$m and 1.55 $\mu$m should be 25 dB with the fiber length of 22.4 mm. The inner cladding 2 was made of pure quartz glass and the outer diameter was about 85 $\mu$m. The outer cladding 3 was doped with $GeO_2$ like the core 1 so that a substantially constant relative refractive-index difference of 0.1% should be obtained. The outer cladding 3 was substantially uniformly doped with Co. The Co content was about one fifth of the Co content of the core 1. The outer diameter of the outer cladding was 125 $\mu$m, similar to that of optical fibers of standard type. An optical attenuator of SC type was manufactured as described in the example of the first embodiment (Example 1) using this optical fiber for optical attenuation.

Basic characteristics were measured at 1.3 $\mu$m band using this optical attenuator of SC type comprising single mode optical fibers of standard type coupled to its both ends, and at 1.55 $\mu$m band using this optical attenuator of SC type comprising dispersion shifted optical fibers. The attenuation was very stable and no beat of attenuation was observed even though the wavelength was somewhat varied. This indicates that acceptable ranges at 1.3 $\mu$m band and at 1.55 $\mu$m band for signal wavelength fluctuation depending light sources and the like were broad. Optical signals were not affected at all, too. Further, when an output of this fixed attenuator was directly received by an optical detector, optical attenuation of substantially the same value as that measured through the optical fibers was obtained and it was stable for the both wavelength bands, 1.3 $\mu$m band and at 1.55 $\mu$m band.

Though the mode field diameter of the optical fibers of standard type coupled to the both ends of the attenuator for the measurement of the basic characteristics at 1.3 $\mu$m band was larger than that of the optical fiber prepared above and therefore the radiation of optical signals into the cladding at the coupling point was quite large, the attenuation remained stable. This indicated that cladding mode was effectively captured and reduced. Thus, in spite of the fact that the addition of the optical attenuation dopant to the cladding was limited to the outermost layer and its content was lower than that of the core 1, cladding mode was effectively reduced.

The same effect as described above can be expected for the case where the cladding is not doped with $GeO_2$ and the outer cladding is doped only with an attenuating dopant. If the amount of the attenuating dopant is larger than the amount used in this embodiment (Example 3), the influence of cladding mode would be more effectively reduced.

As to manufacturing cost, it is evident that the optical fiber can be manufactured at a cost lower than the one having a cladding throughout which is doped with an attenuating dopant, because a part of the cladding is doped with an attenuating dopant, though the cost may be higher than that of the first embodiment (Examples 1 and 2).

EXAMPLE 4

FIG. 8 is a cross-sectional view of an optical fiber for optical attenuation according to the first and second embodiment of the present invention (Example 4) showing its refractive index distribution. The optical fiber comprised a core 1 for optical propagation, core center part 9 having optical attenuation property, inner cladding 2, intermediate cladding 8, a part for attenuating cladding mode, and outer cladding 3, a part for trapping cladding mode. The core 1 was made of quartz glass and doped with $GeO_2$ so that there should be a relative refractive-index difference between the core and the cladding. The relative refractive-index difference between the core 1 and the cladding was 0.75% with the mode field diameter of about 8 $\mu$m, similar to that of dispersion shifted optical fibers. The cutoff wavelength was about 1.2 $\mu$m. The core center part 9 of the core 1 was doped with Co so that the intensity of optical signals should be attenuated.

The doped Co content and the doped region (in the core center part 9) were adjusted so that optical attenuation at both wavelengths of 1.31 µm and 1.55 µm should be 30 dB with the fiber length of 22.4 mm. The inner cladding 2 was made of pure quartz glass and the outer diameter was about 85 µm. The intermediate cladding 8 was substantially uniformly doped with Co. The Co content was about a half of the Co content of the core 1. The outer diameter of the intermediate cladding 8 was 100 µm. The outer cladding 3 was doped with $GeO_2$ like the core 1 so that a substantially constant relative refractive-index difference of 0.2% should be obtained. The outer diameter of the outer cladding was 125 µm, similar to that of optical fibers of standard type. An optical attenuator of SC type was manufactured as described in the example of the first embodiment (Example 1) using this optical fiber for optical attenuation.

The same test as in Example 3 was performed using this optical attenuator of SC type. The attenuation was very stable in the 1.31 µm and 1.55 µm bands and no beat of attenuation was observed even though the wavelength was somewhat varied.

COMPARATIVE EXAMPLE 2

As a comparative sample for the first and second embodiment (Example 4), an optical fiber for optical attenuation where the core had the same structure as the optical fiber of Example 4 and Co was doped throughout the cladding was intended. However, doping throughout the cladding at a concentration similar to that of the core 1 requires many production steps and hence an optical fiber for optical attenuation of the intended type becomes very expensive and has little practical usefulness. Therefore, prepared was an optical fiber wherein only a part of cladding in the vicinity of the core, which had an outer diameter of 50 µm, was doped with Co at a content similar to that of the core. Similar test was performed using this optical fiber. As the wavelength dependency of attenuation, periodically varying beats of attenuation of about 1.5 dB was observed for both of the wavelength bands. Thus, cladding mode eliminating effect was insufficient.

As to average attenuation, it was about 29 dB at 1.3 µm band whereas 35 dB at 1.55 µm band. Thus, wavelength dependency of attenuation was observed. When only the core 1 is doped with Co, a region doped with Co does not substantially depend on the doping amount and is substantially constant and the wavelength dependency can be compensated. However, when the cladding is also doped with Co in the vicinity of the core, attenuation of core propagated mode leaked into the cladding must be considered and it greatly depends on the distribution of Co in the cladding. Therefore, factors to be controlled for maintaining the characteristics are increased. In fact, even though the Co doped region in the core 1 is readjusted, it still becomes difficult to compensate the wavelength dependency and there may be caused a problem that the production yield is lowered. Further, to maintain optical attenuation constant, it is necessary to increase the doped amount of Co at a part where Co-doped region at the center of the core 1 was reduced and thus it becomes difficult to manufacture an attenuator for high attenuation.

In the first and second embodiments (Examples 1 to 4) described above, the attenuating dopant doped in the core 1 or in the vicinity of the core 1 comprised of one kind of dopant. However, the attenuating dopant doped in the core 1 or in the vicinity of the core 1 is doped to control the basic characteristics for optical attenuation and is not limited to one composed of one kind of dopant. As to the attenuating dopant doped in the cladding, two or more dopants may be doped as the case may be, since it is not necessary to expand the doped region. In short, it is important to select the most effective doping method.

Third Embodiment

EXAMPLE 5

FIG. 9 is a cross-sectional view of an optical fiber for optical attenuation according to the third embodiment of the present invention showing its refractive index distribution. The optical fiber comprised a core 1 for optical propagation, inner cladding 2, outer cladding 3 and a low refractive index part 10. In FIG. 9, the core 1 was made of quartz glass and doped with $GeO_2$ so that there should be a relative refractive-index difference between the core 1 and the inner cladding 2. The core diameter was 8 µm and the relative refractive-index difference between the core 1 and the inner cladding 2 was 0.3%. The cutoff wavelength was about 1.1 µm. The core was further doped with Co (cobalt) so that the intensity of optical signals should be attenuated.

The Co content was adjusted so that optical attenuation at a wavelength of 1.55 µm should be 30 dB with the fiber length of 22 mm.

The inner cladding 2 was a trapping part for cladding mode and doped with Co substantially uniformly. The inner cladding 2 had an outer diameter of about 40 µm. The Co content was about a half of that of the core 1, and the Co doping amount in the core 1 could be reduced by the doping of Co, since the refractive index was substantially unchanged by the doping of Co.

The outer cladding 3 was made of pure quartz glass and the outer diameter of the outer cladding, i.e., the outer diameter of the optical fiber for optical attenuation of this example was 125 µm, similar to that of an optical fiber of standard type.

The low refractive index part 10 was composed of a layer doped uniformly with F (fluorine) and having a thickness of 15 µm, which is present outside the inner cladding 2 and inside the outer cladding 3, and the doped content of F was adjusted so that a substantially constant relative refractive-index difference of −0.15% should be obtained.

In the optical fiber for optical attenuation of the third embodiment, since the low refractive index part 10 was sufficiently remote from the core 1, optical signals propagated in the core 1 were not substantially affected by the relative refractive-index difference of the low refractive index part 10.

An optical attenuator of SC type as shown in FIG. 3 was manufactured as described in Example 1 using the optical fiber obtained above. In this case, the ferrule 6 had a length of about 22 mm and its end surfaces had been subjected to advanced PC polishing. Using this optical attenuator of SC type comprising single mode optical fibers of standard type coupled to its both ends, basic characteristics were measured at 1.55 µm band. Results of the measurement of wavelength dependency of attenuation at 1.55 µm band are shown in FIG. 10. As seen from this figure, the attenuation degree of 30 dB was obtained very stably and no beat of attenuation was observed even though the wavelength was somewhat varied.

This was because there was no coupling of optical signals and cladding mode and hence there was no disturbing factor for optical signal propagation, and this indicates that acceptable range at 1.55 µm band for signal wavelength fluctuation depending light sources and the like was broad.

Further, when an output of this fixed attenuator was directly received by an optical detector and measured, optical attenuation of substantially the same value as that measured through the optical fibers was obtained and it was stable.

Moreover, as a simulation of a condition where cladding mode is likely to occur, a similar test was performed by connecting to the both ends of the fixed attenuator of FIG. 3 with optical fibers which had been subjected to a dispersion treatment of the core and whose mode field diameter at the end of the connector was increased by 1.5 times. Also in this case, wavelength dependency of attenuation remained stable, though attenuation was changed due to increase of coupling loss, and it could be confirmed that cladding mode was effectively reduced.

In the manufacture of optical fibers of the third embodiment, the region to be doped with an attenuating dopant may be small since the region of the inner cladding 2 is small. In addition, technique for doping F into the low refractive index part 10 is widely used one and an ordinary process for producing base materials of optical fibers can be used as it is. Therefore, the optical fiber of the third embodiment can be manufactured at a cost lower than the cost for the conventional ones having a cladding throughout which is doped with an attenuating dopant.

As explained above, in the optical fiber of the third embodiment of the present invention, optical signals radiated from the core 1 to the inner cladding 2 and propagated are confined in the inner cladding 2 by providing a layer having a thickness of 15 $\mu$m and doped uniformly with F (fluorine) so that a substantially constant relative refractive-index difference of −0.15% should be obtained in the low refractive index part 10 outside the inner cladding 2. At the same time, by substantially uniformly doping the core 1 and the inner cladding 2 with Co as a dopant, propagating optical signals are attenuated by the dopant of Co. Thus, the influence of cladding mode can be reduced. That is, cladding mode can be effectively reduced by local doping of the inner cladding 2, not doping of the whole optical fiber for optical attenuation.

In addition, not only because doping of the whole optical fiber for optical attenuation is not needed, but also because the content of the dopant does not need to be increased, optical fibers for optical attenuation can be produced at a low cost.

In the third embodiment of the optical fiber of the present invention, refractive indices of the core 1 and the inner cladding 2 were not substantially changed by the doping of Co. Therefore, coupling characteristics such as reflection characteristic advantageously suffer from no influence of the doping.

The method for varying the relative refractive-index difference of the outer side of the inner cladding 2, i.e., inner side of the outer cladding 3, has already become a conventional method and therefore conventional apparatuses for manufacturing optical fibers can advantageously used. Moreover, because the region where the relative refractive-index difference is changed is small, optical fibers for optical attenuation can be produced at a further lower cost.

In the above explanation of the third embodiment, the dopant for optical attenuation doped in the core 1 or in the vicinity of the core 1 comprised of one kind of dopant. However, the attenuating dopant doped in the core 1 or in the vicinity of the core 1 is doped to control the basic characteristics for optical attenuation and therefore is of course not limited to one comprising one kind of dopant.

As to the attenuating dopant doped in the inner cladding 2, two or more dopants such as Cr (chromium) and V (vanadium) may of course be doped as the case may be, for example, when intended wavelength bands and/or fiber parameters are varied, since it is not necessary to expand the doped region.

EXAMPLE 6

FIG. 11 is a cross-sectional view of example of the optical fiber for optical attenuation according to the third embodiment of the present invention, which view shows the refractive index distribution. The optical fiber comprised an optical attenuation dopant region 9.

In the FIG. 11, the optical attenuation dopant region 9 was a region doped with, for example, Co, and it was a region of the inner cladding 2 directly adjacent to the core 1. The core 1 of the optical fiber of this example was also doped with Co in addition to $GeO_2$ like the one in Example 5. That is, the optical fiber of this example had a region corresponding to the region of the optical fiber for optical attenuation of Example 5 doped with the dopant as a part of the inner cladding 2.

As described in Example 5, in the inner cladding 2, the optical attenuation dopant region 9 doped with Co and the region not doped with Co were not substantially different from each other in their refractive index distributions and therefore the refractive index distribution shown in FIG. 11 could be obtained.

Also in this structure, as seen in the refractive index distribution shown in FIG. 11, the core had the highest refractive index. There were also the inner cladding 2 comprising the optical attenuation dopant region 9 outside the core 1, and the low refractive index part 10, of which refractive index was lower than that of the inner cladding 2, outside the inner cladding 2.

Therefore, as in the optical fiber for optical attenuation of Example 5 described above, optical signals entered into the inner cladding 2 is confined within the inner cladding 2 comprising the optical attenuation dopant region 9 and attenuated by the optical attenuation dopant region 9. Accordingly, the optical fiber exerts the same effect as in the optical fiber for optical attenuation of Example 5. In addition, because the region doped with the dopant can be made small, it can be produced at a cost still lower than that of the optical fiber for optical attenuation of Example 5.

Though the whole core 1 was doped with the dopant in this example, only a part may of course be doped like the inner cladding 2.

COMPARATIVE EXAMPLE 3

As a comparative sample for that of Example 5 (third embodiment), an optical fiber for optical attenuation whose core had the same structure as the optical fiber of Example 5 and whose cladding was made of pure quartz glass, i.e., not doped with $GeO_2$, was prepared. A similar test was performed using an optical attenuator of SC type comprising the obtained optical fiber.

In this case, in order to obtain optical attenuation of 30 dB with a length of 22 mm, the amount of Co doped in the core had to be larger than those used in the optical fibers of Examples 5 and 6.

Figure 12:
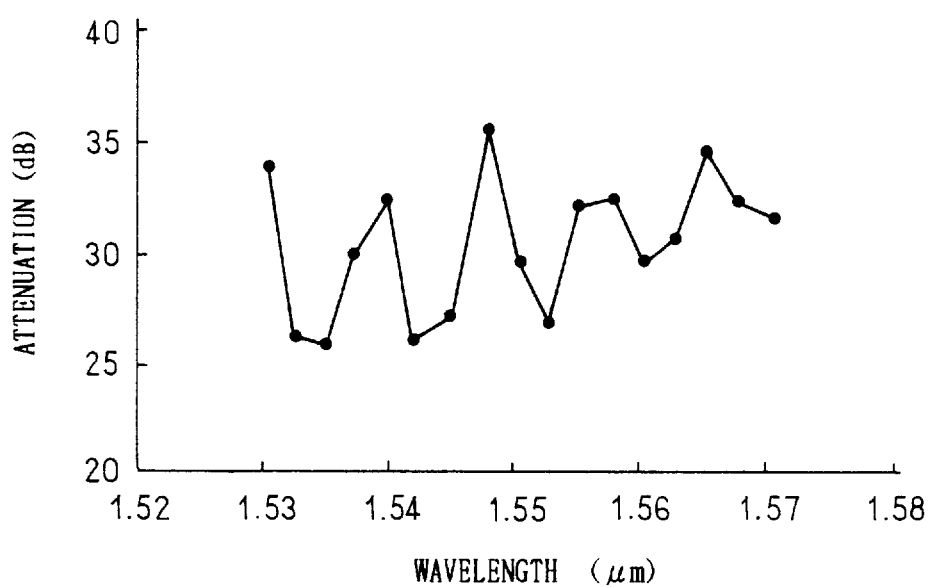
FIG. 12 is a graph showing the result of measurement of wavelength dependency of attenuation for a conventional optical attenuator.

Results of the measurement of wavelength dependency of attenuation, in particular, at 1.55 $\mu$m band, obtained by using the optical attenuator of SC type prepared above were shown in FIG. 12.

The wavelength dependency of attenuation showed periodically varying beats of a magnitude as large as ±5 dB and, from these results, it was confirmed that attenuation could significantly change by a little change of the wavelength. Further, optical signals sometimes could not propagate properly due to coupling of cladding mode.

Thus, it was revealed that cladding mode can be eliminated more effectively by using the optical fiber shown in FIG. 9 according to the third embodiment of the present invention.

In the above explanations of the first to third embodiments (Examples 1 to 6), only attenuators for high attenuation have been described. However, the advantage of the present invention can be evidently obtained in attenuators for low attenuation. In particular, when optical fibers having different mode field diameters are used and coupled, or when a plurality of optical attenuators are used and coupled in series, the advantage of the present invention would be remarkable.

Further, in the above explanations of the first to third embodiments (Examples 1 to 6), only optical attenuators for single mode optical fibers have been described. However, the advantage of the present invention can of course be obtained in attenuators for multimode optical fibers and filters for single mode and multimode optical fibers. In addition, depending on the use, the advantage can of course be expected for optical fibers made of a material other than quartz glass.

Further the optical fiber with the invention can be applied to the terminator with simple structure because the reflected optical power attenuated effectively only by using the optical fiber without any special end-treatment.

Of course, kind, amount, doping method and the like of the dopant for the optical fiber for optical attenuation of the present invention are not limited to those described in the above examples.

The present invention has been specifically explained by the reference to the working examples mentioned above, but the present invention is not limited to the examples and various modifications and alterations can of course be made within the scope of the present invention.

If the invention is applied to the fiber with a normal core which is doping any attenuative material and/or has any attenuative structure, the fiber functions as the mode filter which effectively attenuates only the cladding propagation modes.

The typical advantages of the present invention can be summarized as follows.
(1) cladding mode can be effectively reduced without affecting the attenuating characteristics of optical attenuators (first and second embodiments).
(2) Optical fibers for optical attenuation excellent in characteristic stability can be produced at a low cost.
(3) Because a part for trapping cladding mode is provided in a region sufficiently remote from the core, the mode field shape of basic mode is not altered when refractive index of the trapping part is changed and the basic characteristics such as attenuation wavelength characteristic of optical attenuators are not altered when an attenuating dopant is added to the trapping part. Therefore, characteristics of optical attenuation can be controlled only by structures around the core(first and second embodiments).
(4) Because refractive index of the cladding in the vicinity of the core is unchanged, coupling characteristics such as reflection characteristic are not affected.
(5) Because the part for trapping cladding mode does not need to be the whole cladding and desired effect can be obtained only by changing the relative refractive-index difference, the cladding can be produced by only a conventional apparatus for producing optical fibers(first and second embodiments).
(6) If an attenuating dopants are added, the doping region and amount do not need to be large. Therefore, increase of the cost of attenuating optical fibers can be suppressed.

What is claimed is:

1. An optical attenuator for attenuation of intensity of optical signals, said optical attenuator including an optical fiber attenuator comprising:
   a core having a first refractive index;
   a cladding including:
      a first cladding portion adjacent to and surrounding said core and having a second refractive index lower than said first refractive index; and
      a second cladding portion surrounding said first cladding portion and having a third refractive index higher than said second refractive index; and
   at least one attenuation dopant for significantly attenuating the intensity of optical signals, said attenuating dopant being incorporated into at least one of said core and said first cladding portion.

2. The optical attenuator of claim 1 wherein said cladding additionally includes another dopant for increasing refractive index only in said second cladding portion.

3. The optical attenuator of claim 2 wherein said second cladding portion additionally contains said attenuation dopant.

4. The optical attenuator of claim 3, wherein said another dopant is $GeO_2$ and said attenuation dopant is Co.

5. The optical attenuator of claim 2 wherein the concentration of said another dopant increases radially outward and gradually across said second cladding portion.

6. The optical attenuator of claim 1 wherein said core contains said attenuation dopant and another dopant for increasing said first refractive index.

7. The optical attenuator of claim 6 wherein said attenuation dopant is Co and said another dopant is $GeO_2$.

8. The optical attenuator of claim 1 additionally including a zirconia ferrule coextensive with the length of said optical fiber attenuator.

9. The optical attenuator of claim 8 additionally including means for applying uniform radial pressure to said ferrule.

10. The optical attenuator of claim 1, wherein a part or the whole of said second cladding portion is doped with an attenuation dopant for attenuating the intensity of optical signals.

11. The optical attenuator of claim 1 wherein said attenuation dopant is Co.

12. The optical attenuator of claim 1 additionally including at least one optical fiber coupled to an end of said optical fiber attenuator.

13. The optical attenuator of claim 1 wherein said dopant provides 20–30 dB of attenuation of an optical signal of a wavelength of 1.3 $\mu$m per 22.4 mm length of said optical fiber attenuator.

14. An optical attenuator for attenuation of intensity of optical signals, said optical attenuator including an optical fiber attenuator comprising:
   a core having a first refractive index;
   a cladding including:
      a first cladding portion adjacent to and surrounding said core and having a second refractive index lower than said first refractive index; and
      a second cladding portion surrounding said first cladding portion;

at least a first attenuation dopant for significantly attenuating the intensity of optical signals, said first attenuating dopant being incorporated into at least one of said core and said first cladding portion; and at least a second attenuation dopant, for significantly attenuating the intensity of optical signals, incorporated into said second cladding portion.

15. The optical attenuator of claim 14 additionally including a zirconia ferrule coextensive with the length of said optical fiber attenuator.

16. The optical attenuator of claim 15 additionally including means for applying uniform radial pressure to said ferrule.

17. The optical attenuator of claim 14 additionally including at least one optical fiber coupled to an end of said optical fiber attenuator.

18. The optical attenuator of claim 14 wherein said first and second attenuation dopants are Co.

19. The optical attenuator of claim 14 wherein said dopant provides 20–30 dB of attenuation of an optical signal of a wavelength of 1.3 $\mu$m per 22.4 mm length of said optical fiber attenuator.

20. An optical attenuator for attenuation of intensity of optical signals, said optical attenuator including an optical fiber attenuator comprising:

a core having a first refractive index;

a cladding including:

a first cladding portion adjacent to and surrounding said core and having a second refractive index lower than said first refractive index; and a second cladding portion surrounding said first cladding portion; and at least one attenuation dopant for significantly attenuating the intensity of optical signals, said attenuating dopant being incorporated into said first cladding portion.

21. The optical attenuator of claim 20 additionally including a zirconia ferrule coextensive with the length of said optical fiber attenuator.

22. The optical attenuator of claim 21 additionally including means for applying uniform radial pressure to said ferrule.

23. The optical attenuator of claim 20 wherein said one attenuation dopant is Co.

24. The optical attenuator of claim 20 wherein said dopant provides 20–30 dB of attenuation of an optical signal of a wavelength of 1.3 $\mu$m per 22.4 mm length of said optical fiber attenuator.

25. The optical attenuator of claim 20 wherein said second cladding has a third refractive index less than said second refractive index.

26. The optical attenuator of claim 20 additionally including at least one optical fiber coupled to an end of said optical fiber attenuator.

* * * * *

UNITED STATES PATENT AND TRADEMARK OFFICE
CERTIFICATE OF CORRECTION

PATENT NO.   : 5,841,926
DATED        : November 24, 1998
INVENTOR(S)  : Takeuchi et al.

It is certified that error appears in the above-identified patent and that said Letters Patent is hereby corrected as shown below:

The title page should be deleted to appear as per attached title page.

Please delete columns 1-16 and substitute columns 1-16 as per attached.

Signed and Sealed this

Nineteenth Day of March, 2002

*Attest:*

*Attesting Officer*

JAMES E. ROGAN
*Director of the United States Patent and Trademark Office*

United States Patent [19]
Takeuchi et al.

[11] Patent Number: 5,841,926
[45] Date of Patent: Nov. 24, 1998

[54] OPTICAL FIBERS FOR OPTICAL ATTENUATION

[75] Inventors: Yoshiaki Takeuchi; Ryo Nagase; Seiko Mitachi, all of Mito; Yuichi Morishita, Yokohama; Akira Kumagai; Yumi Ariga, both of Kanagawa; Kenichi Muta, Kawasaki; Kazunari Sugi, Kanagawa; Masashi Saijo, Saitama, all of Japan

[73] Assignees: Nippon Telegraph and Telephone Corporation; Showa Electric Wire & Cable Co., Ltd., both of Japan

[21] Appl. No.: 777,205

[22] Filed: Dec. 27, 1996

[30] Foreign Application Priority Data

Jan. 4, 1996 [JP] Japan .................... 8-000004
May 22, 1996 [JP] Japan .................... 8-126633

[51] Int. Cl.[6] .................................................. G02B 6/02
[52] U.S. Cl. .................................... 385/123; 385/140
[58] Field of Search ............................. 385/123–128, 385/140–145

[56] References Cited

U.S. PATENT DOCUMENTS 4,610,506  9/1986  Tokunaga et al. ............ 385/128
5,509,101  4/1996  Gilliland et al. ............ 385/123 X

FOREIGN PATENT DOCUMENTS 5264816   3/1992  Japan.
6109923   9/1992  Japan.
5089784   4/1993  Japan.
5267710   6/1997  Japan.

*Primary Examiner*—Phan T.H. Palmer
*Attorney, Agent, or Firm*—Lorusso & Loud

[57] ABSTRACT

Disclosed are optical fibers for optical attenuation comprising a core and a cladding, wherein the cladding comprises two or more parts different from each other in their refractive indices and/or the attenuating dopant existence. By using the optical fibers for optical attenuation of the present invention, an optical attenuator which can effectively reduce the effect of cladding mode upon coupling of optical fibers and is excellent in characteristic stability can be manufactured at a low cost.

26 Claims, 7 Drawing Sheets

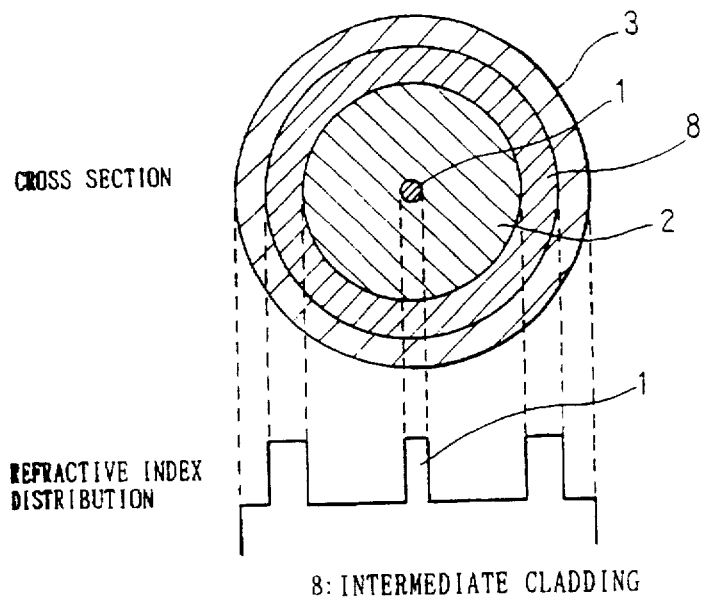

OPTICAL FIBERS FOR OPTICAL ATTENUATION

BACKGROUND OF THE INVENTION

1. Field of the Invention

The present invention relates to an optical fiber for optical attenuation. In particular, the present invention relates to an optical attenuator used for attenuating intensity of optical signals at a constant rate, which is used in the fields of optical communication, optical instrumentation, CATV systems and the like.

2. Related Art

Though several methods for attenuating optical signals to a certain degree by means of an optical fiber attenuator have previously been proposed, a need still exits for a stable optical attenuator capable of high attenuation with high input power. The known methods for providing such an optical attenuator for high attenuation include a method using filters positioned between optical fibers and a method incorporating an optical attenuation dopant into optical fibers. Of these, the method using an optical attenuation dopant is considered advantageous because of the ease of assembling an attenuator using such optical fibers, high reliability, low cost and the like. This technique is disclosed in, for example, Japanese Patent Application Unexamined Publication Nos. Sho 54-2754, Hei 6-303156, Japanese Utility Model Application Unexamined Publication Nos. Sho 63-96504, 63-96506 and the like.

Examining such prior techniques as mentioned above, the present inventors found the following problems.

A fixed attenuator is usually used by coupling optical fibers to both its ends or to one end. At the coupled point, a small part of the optical signals is radiated into the cladding because of mismatch of cores of the coupled optical fibers and difference of mode field. In coupling of optical fibers of the standard type, the signal entering the cladding at the coupling point is extremely small relative to the intensity of optical signals propagated through the core and therefore it may be considered to become substantially extinct during propagation through the optical fibers.

However, the present inventors confirmed that, because optical fibers used in fixed optical attenuators having such a structure as described above are short in length and are fixed linearly and, accordingly, the cladding mode signal propagation generated at the coupling point of the input end is likely to propagate to the output end of the fixed attenuator and to enter into a core of a optical fiber coupled at the coupling point of the output end.

Though measured values would vary depending on the measurement conditions, propagation loss due to cladding mode propagation was about 40 dB including coupling loss upon re-coupling according to the present inventors' measurement. If the optical fiber is relatively long and has curvature, that value would further be reduced and therefore the propagation in the cladding mode can be neglected for coupling of ordinary optical fibers. Further, such cladding mode propagation can be considered to cause no practical problem in an attenuator of 10 dB or less even in a fixed optical attenuator.

However, in the case of a fixed attenuator for high attenuation, because the difference between intensities of the attenuated signals propagated in the core and in the cladding becomes relatively small, wavelength dependent fluctuation of the attenuation is observed and attenuation magnitude becomes unstable. Thus, problems would occur, for example, optical signals could not be properly propagated.

In the above discussion, it is assumed that shape of propagation mode field of the optical fiber used for the fixed attenuator and that of the optical fibers to be coupled are substantially the same. However, if they are different, relative intensity of the light radiating into the cladding is further increased and it is evident that problems such as mentioned above occur even in a fixed attenuator with attenuation of 10 dB or less. Further, if the positional mismatch of the coupled cores is significant, the same problems occur even though the shapes of mode field are substantially the same.

In addition, while the influence of the cladding mode is explained above for an optical attenuator using an optical fiber for optical attenuation, as described in Japanese Patent Application Unexamined Publication No. 6-109923, the problem of cladding mode propagation is seen not only in the case where an optical fiber is used for optical attenuation, but is also broadly seen in optical attenuators in a generic sense.

Methods for overcoming this problem have been suggested in Japanese Patent Application Unexamined Publication Nos. 5-264816, 6-109923 and the like. These methods use attenuating optical fibers where the cladding is made of an attenuating medium. However, because an attenuating dopant is added throughout the cladding of the optical fiber used for these methods, they suffer from the problem that the optical fibers used for optical attenuation become expensive. For an optical fiber for higher attenuation, a correspondingly larger amount of attenuation dopant is needed. However, it is technically difficult to add the dopant uniformly for a high content and thus optical fibers for optical attenuation become expensive.

As described in Japanese Patent Application Unexamined Publication No. 6-109923, when attenuation in the cladding should be higher than in the core, the dopant content should be further increased and hence the cost of optical fibers for optical attenuation becomes even higher. In addition, it is very difficult to add the dopant throughout the cladding at a concentration higher than that used in the core.

With respect to optical attenuation characteristics, when the whole cladding is made of an attenuating medium, the wavelength dependency of degree of attenuation varies greatly depending on the characteristic of the attenuation dopant. Because the absorption spectrum of such a dopant usually varies depending on the wavelength, the optical attenuation characteristics should also vary depending on the wavelength of the optical signals.

However, manufacture of an optical attenuator of a structure usable at two or more multiple wavelengths is more difficult than that of conventional optical attenuators. This problem may be overcome by, for example, by adding two or more kinds of attenuating materials to the cladding to offset the wavelength dependency of the dopants. However, it is technically difficult to add two or more kinds of attenuating materials to the cladding so that the wavelength dependency of the dopants offset and this approach is inevitably accompanied by an increased cost in the optical fibers for optical attenuation.

One of the problems commonly observed in the methods where an attenuating dopant is added throughout the cladding is increase of refractive index due to the addition of the attenuating dopant. An increase in the refractive index of the cladding makes it necessary to correspondingly increase the refractive index of the core and, therefore, it is necessary to increase the amount of dopant which elevates the refractive index to control the relative refractive-index difference. Furthermore, if the refractive indices of the core and the cladding are excessively increased, while there may be a relative refractive-index difference between the attenuating optical fiber and ordinary optical fiber, it undesirably leads to increased reflection of optical signals at the coupling points between the optical fibers and an optical attenuator, which reflection adversely affects the basic performance of the optical attenuator.

Therefore, the object of the present invention is to provide a technique for reducing the effect of cladding mode propagation upon coupling of optical fibers and to provide an optical attenuator having excellent characteristic stability at a low cost.

Other objects of the present invention and novel characteristics thereof will become apparent from the following descriptions and the appended drawings.

SUMMARY OF THE INVENTION

According to the first embodiment of the present invention, there is provided an optical fiber for optical attenuation consisting of a core and a cladding surrounding the core and having a refractive index lower than that of the core within at least a part of the cladding in the vicinity of the core, the core or the part of the cladding in the vicinity of the core comprising a dopant for attenuating optical signals. The cladding, in addition to the portion in the vicinity of the core, has a high refractive index, portion, i.e. a portion having a refractive index higher than that of the portion of the cladding in the vicinity of the core.

In the above optical fiber, a part or the whole of the high refractive index portion of the cladding may be doped with a dopant for attenuating optical signals.

According to the second embodiment of the present invention, there is provided an optical fiber for optical attenuation consisting of a core and a cladding surrounding the core and having a portion adjacent the core with a refractive index lower than that of the core. The core or the portion of the cladding other than the portion adjacent the core contains a dopant for attenuating optical signals.

The optical fibers of the first and second embodiments described above are characterized mainly in that the cladding includes a portion for trapping optical signals propagated in the cladding which portion is sufficiently separated from the core to prevent the optical signals propagated in the cladding from re-coupling with the core.

In conventional fixed attenuators, either the cladding has no attenuating property or the whole cladding has an attenuating property. Therefore, the structure described above, including a cladding portion for trapping optical signals propagated in the cladding and positioned sufficiently remote from the core, is considered to be new. The present inventors confirmed that cladding mode propagation, detrimental for an optical attenuator, is basically not a mode trapped in the vicinity of the core, but rather, a mode in a portion of the cladding remote from the core. Further, it has also been confirmed that the cladding mode can be sufficiently reduced only by providing for trapping the cladding mode within a portion of the cladding remote from the core.

According to the third embodiment of the present invention, there is provided an optical fiber for optical attenuation consisting of a core and a cladding surrounding the core and having a portion adjacent the core with a refractive index lower than that of the core. The cladding includes an inner cladding and a low refractive index portion surrounding the inner cladding and having a refractive index lower than that of the inner cladding and that of the core. Part or the whole of the inner cladding contains a dopant for attenuating optical signals.

In the optical fiber of the third embodiment of the invention, because of the dual structure of the cladding comprising the inner cladding and the low refractive index outer cladding having a refractive index lower than that of the inner cladding, optical signals leaked from the core to the cladding are confined within the inner cladding.

On the other hand, because of the structure where the core and a part or the whole of the inner cladding contains a dopant for attenuating optical signals, optical signals generated upon coupling and confined within the inner cladding can be attenuated and hence the influence of cladding mode can be reduced.

The optical fibers for optical attenuation of the first to third embodiments of the present invention commonly use a cladding comprising two or more portions different in their refractive indices and/or presence of the attenuating dopant. However, the optical fibers of the first and second embodiments are different from the one of the third embodiment, since, in the optical fibers of the first and second embodiments, the refractive index of the outer cladding is larger than that of the inner cladding, and on the other hand, in the optical fiber of the third embodiment, refractive index of the inner cladding is larger than that of the outer cladding. Therefore, their mechanisms for dealing with cladding mode are completely different from each other as described below.

Thus, in the optical fibers of the first and second embodiments, the effect of cladding mode is reduced by trapping and/or attenuating optical signals propagated in the cladding by means of the outer cladding. On the other hand, in the optical fiber of the third embodiment, the effect of the cladding mode is reduced by confining optical signals propagated in the cladding within the inner cladding and attenuating the signals by means of a dopant in the core or in a part or all of the inner cladding as described above.

BRIEF DESCRIPTION OF THE DRAWINGS

FIG. 1 is a cross-sectional view of an optical fiber for optical attenuation according to the first embodiment of the present invention (Example 1) showing its refractive index distribution.

FIG. 2 shows the structure of zirconia ferrule used for the fixed optical attenuator using the optical fiber according to the first embodiment of the present invention (Example 1).

FIG. 3 shows the structure of an optical attenuator of the SC type using the optical fiber according to the first embodiment of the present invention (Example 1).

FIG. 4 is a graph showing the wavelength dependency attenuation at 1.3 μm band for the first embodiment of the present invention (Example 1).

FIG. 5 is a graph showing the wavelength dependency of attenuation at 1.3 μm band for a comparative example, i.e. comparison with the first embodiment of the present invention (Example 1).

FIG. 6 is a cross-sectional view of an optical fiber for optical attenuation according to the first embodiment of the present invention (Example 2) showing its refractive index distribution.

FIG. 7 is a cross-sectional view of an optical fiber for optical attenuation according to the second embodiment of the present invention (Example 3) showing its refractive index distribution.

FIG. 8 is a cross-sectional view of an optical fiber for optical attenuation according to the second embodiment of the present invention (Example 4), showing its refractive index distribution.

FIG. 9 is a cross-sectional view of an optical fiber for optical attenuation according to the third embodiment of the present invention (Example 5), showing its refractive index distribution.

FIG. 10 is a graph showing the wavelength dependency of attenuation at 1.55 μm band for the fixed attenuator of the SC type of Example 5.

FIG. 11 is a cross-sectional view of an optical fiber for optical attenuation according to the third embodiment of the present invention (Example 6), showing its refractive index distribution.

FIG. 12 is a graph showing the wavelength dependency of attenuation for a conventional optical attenuator.

BEST MODE FOR CARRYING OUT THE INVENTION

The present invention will be further explained hereinafter by reference to the following examples and the appended drawings.

First embodiment

EXAMPLE 1

FIG. 1 is a cross-sectional view of an optical fiber for optical attenuation according to the first embodiment of the present invention (Example 1) showing its refractive index distribution. The optical fiber includes a core 1 for optical propagation, inner cladding 2 and outer cladding 3, providing for trapping of the cladding mode. The core 1 is quartz glass and is doped with $GeO_2$ to provide a relative refractive-index difference between the core 1 and the cladding. The relative refractive-index difference between the core and the cladding was 0.3% with a core diameter of 8 μm. The cutoff wavelength was about 1.1 μm. The core 1 was further doped with Co (cobalt) to provide for the attenuation of the intensity of optical signals. As described in Japanese Utility Model Application Unexamined Publication No. Hei 3-61547, Co is an element suitable for optical attenuation at the 1.3 μm and 1.55 μm wavelength bands. The Co content was adjusted so that optical attenuation at a wavelength of 1.3 μm was 30 dB for a fiber length of 22.4 mm. The inner cladding 2 was made of pure quartz glass and its outer diameter was about 40 μm. The outer cladding was doped with $GeO_2$, like the core, and the dopant content gradually increased from its inner side to its outer side and its radially outer portion had a $GeO_2$ content providing a substantially constant relative refractive-index difference of 0.15%. The outer diameter of the outer cladding was 125 μm, similar to that of an optical fiber of a standard type. As to the relative refractive-index difference, the cladding was about a half that of the core. However, the portion of the cladding of highest refractive index was sufficiently remote from the core that optical signals propagated in the core were not affected.

FIG. 2 shows a structure exemplifying use of the optical fiber described above, where the optical fiber is fixed in a zirconia ferrule. In this figure, the optical fiber for optical attenuation 4 manufactured as described above is fixed in a zirconia ferrule 5 having a length of 22.4 mm. A zirconia ferrule is a conventional component for fixing optical fibers. The length of the optical fiber 4 used for optical attenuation 4 was defined by the length of the zirconia ferrule 5 and attenuation of optical signals is determined by the length of the optical fiber 4 and the content of doped Co.

Therefore, if the length of the optical fiber 4 is not particularly defined, for example, as in the case where single mode optical fibers of standard type were coupled to one or both ends of the optical fiber 4, fixed attenuators with various attenuation degrees can be manufactured from one kind of the optical fiber 4 by varying the length of the optical fiber 4.

FIG. 3 shows an example of a fixed attenuator of the SC type using the ferrule described surrounding the optical fiber 4 and further including a sleeve 6 and housing 7. The sleeve 6 serves to adjust the center axes of the optical fibers by applying a radial uniform pressure to the cylindrical ferrule. The housing 7 is a container for the fixed attenuator of the SC type.

Using this optical attenuator of the SC type comprising single mode optical fibers of the standard type coupled to both ends of the optical attenuator, basic characteristics at 1.3 μm band were measured. Results of the measurement of wavelength dependency of attenuation at 1.3 μm band are shown in FIG. 4. An attenuation of 30 dB was obtained very stably and no variation in attenuation was observed even though the wavelength was somewhat varied. This was because there was no coupling of optical signals and no cladding mode propagation and hence there was no inhibition of optical signal propagation. The foregoing indicates that an acceptable range around 1.3 μm band, allowing for signal wavelength fluctuation depending on the light sources and the like, was broad.

Moreover, as a simulation of a condition where cladding mode propagation is likely to occur, a similar test was performed by connecting both ends of the attenuator with optical fibers which had been subjected to a dispersing treatment of the core and whose mode field diameter at the end of the connector was increased by 1.5 times. In this case also, attenuation was stable and it could be confirmed that cladding mode propagation was effectively reduced.

It is evident that the above optical fiber can be manufactured at a cost lower than one having a cladding which is doped throughout with an attenuating dopant, because an ordinary process for producing the basic components of optical fibers can be used as is for doping $GeO_2$ into the cladding of the optical fiber 4 where only a part of the cladding is doped with $GeO_2$.

Comparative Example 1

As a comparison with Example 1 (first embodiment), an optical fiber having a core of the same structure as the optical fiber of Example 1 and cladding which was not doped with $GeO_2$ was prepared and a similar test was performed. Results of the measurement of wavelength dependency of attenuation at 1.3 μm band are shown in FIG. 5. As the wavelength changed, the attenuation showed periodically varying peaks of a magnitude as large as ±5 dB and thus it was confirmed that attenuation could significantly change with little change of the wavelength. This difference in results clearly demonstrated the cladding mode eliminating effect of the optical fiber attenuator of the present invention.

EXAMPLE 2

FIG. 6 is a cross-sectional view of an optical fiber for optical attenuation according to the first embodiment of the present invention (Example 2) showing its refractive index distribution. The optical fiber included a core 1 for optical propagation, inner cladding 2, intermediate cladding 8, for trapping cladding mode propagation, and outer cladding 3. The core 1 was made of quartz glass and doped with $GeO_2$ to provide a relative refractive-index difference between the core and the cladding. The relative refractive-index difference between the core and the cladding was 0.3% with the diameter of the core 1 of 8 μm. The cutoff wavelength was about 1.1 μm. The core 1 was doped with V (vanadium) to provide for attenuation of the intensity of optical signals.

The V content was adjusted so that optical attenuation at a wavelength of 1.31 μm was 20 dB with a fiber length of 22.4 mm. The inner cladding 2 and the outer cladding 3 were made of pure quartz glass. The outer diameter of the inner cladding 2 was about 75 μm and the outer diameter of the outer cladding was 125 μm, similar to that of an optical fiber of the standard type. The intermediate cladding 8 was doped with $GeO_2$ like the core to provide a substantially constant relative refractive-index difference of 0.3%. The outer diameter of the intermediate cladding 8 was 100 μm. An optical attenuator of the SC type was assembled as described in Example 1 using this optical fiber for optical attenuation.

Using this optical attenuator of the SC type comprising single mode optical fibers of the standard type coupled to both ends of the optical attenuator, basic characteristics were measured at 1.3 μm band. The attenuation was very stable and no peaks of attenuation were observed even though the wavelength was somewhat varied.

Second embodiment

EXAMPLE 3

FIG. 7 is a cross-sectional view of an optical fiber for optical attenuation according to the first embodiment of the present invention (Example 3) showing its refractive index distribution. The optical fiber is shown to include a core outer portion 1 for optical propagation, core center portion 9 having an optical attenuation property, inner cladding 2, and outer cladding 3, the outer cladding serving for trapping and attenuating the cladding mode. The core 1 was quartz glass doped with $GeO_2$ to provide a relative refractive-index difference between the core 1 and the cladding. The relative refractive-index difference between the core 1 and the cladding was 0.75% with a mode field diameter of about 8 μm, similar to that of dispersion shifted optical fibers. The cutoff wavelength was about 1.2 μm. The core center portion 9 was doped with Co to attenuate the intensity of optical signals.

The doped Co content and the doped region (in the core center portion) were adjusted so that the optical attenuation at both wavelengths of 1.31 μm and 1.55 μm was 25 dB for a fiber length of 22.4 mm. The inner cladding 2 was made of pure quartz glass and the outer diameter was about 85 μm. The outer cladding 3 was doped with $GeO_2$ like the core 1 to provide a substantially constant relative refractive- index difference of 0.1%. The outer cladding 3 was substantially uniformly doped with Co in an amount about one fifth of the Co content of the core 1. The outer diameter of the outer cladding was 125 μm, similar to that of optical fibers of the standard type. An optical attenuator of the SC type was manufactured as described in the example of the first embodiment (Example 1) using this optical fiber for optical attenuation.

Basic characteristics were measured at 1.3 μm band using this optical attenuator of the SC type with single mode optical fibers of the standard type coupled to both its ends, and at 1.55 μm band using this optical attenuator of the SC type with dispersion shifted optical fibers coupled thereto. The attenuation was very stable and no variation of attenuation was observed even though the wavelength was varied somewhat. This indicates that acceptable broad ranges at 1.3 μm band and at 1.55 μm band, allowing for signal wavelength fluctuation depending light sources and the like. Moreover, optical signals were not affected at all. Further, when the output of this fixed attenuator was directly received by an optical detector, optical attenuation of substantially the same value as that measured through the optical fibers was obtained and it was stable for the both wavelength bands, i.e. the 1.3 μm band and the 1.55 μm band.

Though the mode field diameter of the optical fibers of the standard type coupled to both ends of the attenuator for the measurement of the basic characteristics at 1.3 μm band was larger than that of the optical fiber prepared above and therefore the radiation of optical signals into the cladding at the coupling point was quite large, the attenuation remained stable. This indicated that cladding mode was effectively captured and reduced. Thus, in spite of the fact that the addition of the optical attenuation dopant to the cladding was limited to the outermost layer and its content was lower than that of the core 1, the cladding mode was effectively reduced.

The same effect as described above can be expected for the case where the cladding is not doped with $GeO_2$ and the outer cladding is doped only with an attenuating dopant. If the amount of the attenuating dopant is larger than the amount used in this embodiment (Example 3), the influence of cladding mode would be more effectively reduced.

As to manufacturing cost, it is evident that the optical fiber can be manufactured at a cost lower than the one having a cladding which is doped throughout with an attenuating dopant, because only a part of the cladding is doped with an attenuating dopant, though the cost may be higher than that of the first embodiment (Examples 1 and 2).

EXAMPLE 4

FIG. 8 is a cross-sectional view of an optical fiber for optical attenuation according to the first and second embodiments of the present invention (Example 4) showing its refractive index distribution. The optical fiber is shown to include a core 1 for optical propagation, a core center 9 having an optical attenuation property, inner cladding 2, intermediate cladding 8 for attenuating the cladding mode, and outer cladding 3 for trapping the cladding mode. The core 1 was quartz glass doped with $GeO_2$ to provide a relative refractive-index difference between the core and the cladding. The relative refractive-index difference between the core 1 and the cladding was 0.75% with a mode field diameter of about 8 μm, similar to that of dispersion shifted optical fibers. The cutoff wavelength was about 1.2 μm. The core center 9 was doped with Co to attenuate the intensity of optical signals.

The doped Co content and the doped region (the core center 9) were adjusted so that optical attenuation at both wavelengths of 1.31 μm and 1.55 μm was 30 dB with a fiber length of 22.4 mm. The inner cladding 2 was made of pure quartz glass and the outer diameter was about 85 Mm. The intermediate cladding 8 was substantially uniformly doped with Co in an amount about half of the Co content of the core 1. The outer diameter of the intermediate cladding 8 was 100 μm. The outer cladding 3 was doped with $GeO_2$ like the core 1 to provide a substantially constant relative refractive-index difference of 0.2%. The outer diameter of the outer cladding was 125 μm, similar to that of optical fibers of the standard type. An optical attenuator of the SC type was manufactured as described in the example of the first embodiment (Example 1) using this optical fiber for optical attenuation.

The same test as in Example 3 was performed using this optical attenuator of the SC type. The attenuation was very stable in the 1.31 μm and 1.55 μm bands and no fluctuation of attenuation was observed even though the wavelength was varied somewhat.

Comparative Example 2

As a comparison with the first and second embodiments (Example 4), an optical fiber for optical attenuation where the core would have the same structure as the optical fiber of Example 4 and would be doped with Co throughout the cladding was desired. However, doping throughout the cladding at a concentration similar to that of the core 1 requires many production steps and hence an optical fiber for optical attenuation of the type desired for comparison becomes very expensive and has little practical usefulness. Therefore, an optical fiber was prepared wherein only a part of cladding in the vicinity of the core, which had an outer diameter of 50 μm, was doped with Co at a content similar to that of the core. A similar test was performed using this optical fiber. The attenuation showed periodically varying peaks of about 1.5 dB at both the wavelength bands. Thus, cladding mode eliminating effect was insufficient.

Average attenuation was about 29 dB at the 1.3 μm band and 35 dB at the 1.55 μm band. Thus, wavelength dependency on attenuation was observed. When only the core 1 is doped with Co, attenuation within the region doped with Co does not substantially depend on the doping amount and is substantially constant, i.e. the wavelength dependency is compensated for. However, when the cladding is also doped with Co in the vicinity of the core, attenuation of core propagated mode leaking into the cladding must be considered and such leaking greatly depends on the distribution of Co in the cladding. Therefore, the factors to be controlled for maintaining the characteristics are increased. In fact, even though the Co doped region in the core 1 is readjusted, it is still difficult to compensate for the wavelength dependency and there may be a problem in that the production yield is lowered. Further, to maintain the optical attenuation constant, it is necessary to increase the amount of Co dopant in a reduced Co-doped region at the center of the core 1 and thus it becomes difficult to manufacture an attenuator for high attenuation.

In the first and second embodiments (Examples 1 to 4) described above, the attenuating dopant doped into the core 1 or in the vicinity of the core 1 comprised one kind of dopant. However, the purpose of the attenuating dopant doped in the core 1 or in the vicinity of the core 1 is to control the basic characteristics of optical attenuation and is not limited to one composed of one kind of dopant. As to the attenuating dopant doped in the cladding, two or more dopants may be used, since it is not necessary to expand the doped region. In short, it is important to select the most effective doping method.

Third embodiment

EXAMPLE 5

FIG. 9 is a cross-sectional view of an optical fiber for optical attenuation according to the third embodiment of the present invention showing its refractive index distribution. The optical fiber is shown in FIG. 9 as including a core 1 for optical propagation, an inner cladding 2, an outer cladding 3 and a low refractive index portion 10. In FIG. 9, the core 1 was quartz glass doped with $GeO_2$ to provide a relative refractive-index difference between the core 1 and the inner cladding 2. The core diameter was 8 μm and the relative refractive-index difference between the core 1 and the inner cladding 2 was 0.3%. The cutoff wavelength was about 1.1 μm. The core was further doped with Co (cobalt) to attenuate the intensity of optical signals.

The Co content was adjusted so that optical attenuation at a wavelength of 1.55 μm was 30 dB with the fiber length of 22 mm.

The inner cladding 2 provides the function of trapping the cladding mode and was doped substantially uniformly with Co. The inner cladding 2 had an outer diameter of about 40 μm. The Co content was about a half of that of the core 1, and the Co doping amount in the core 1 could be reduced, since the refractive index was substantially unchanged by the doping with Co.

The outer cladding 3 was made of pure quartz glass and the outer diameter of the outer cladding, i.e., the outer diameter of the optical fiber in this example was 125 μm, similar to that of an optical fiber of the standard type.

The low refractive index portion 10 was composed of a layer doped uniformly with F (fluorine) and had a thickness of 15 μm, and was located between the inner cladding 2 and the outer cladding 3, and the content of the dopant F was adjusted to provide a substantially constant relative refractive-index difference of −0.15%.

In the optical fiber of the third embodiment, since the low refractive index portion 10 was sufficiently remote from the core 1, optical signals propagated in the core 1 were not substantially affected by the relative refractive-index difference of the low refractive index portion 10.

An optical attenuator of the SC type as shown in FIG. 3 was manufactured as described in Example 1 using the optical fiber obtained above. In this case, the ferrule 6 had a length of about 22 mm and its end surfaces had been subjected in advance to PC polishing. Using this optical attenuator of the SC type comprising single mode optical fibers of the standard type coupled to both its ends, basic characteristics were measured at the 1.55 μm band. Results of the measurement of wavelength dependency of attenuation at the 1.55 μm band are shown in FIG. 10. As seen from this figure, the degree of attenuation was 30 dB and was very stable and no fluctuation of attenuation was observed even though the wavelength was varied somewhat. These results are attributed to the facts that there was no coupling of optical signals and no cladding mode and hence there was no disturbance of optical signal propagation. These results indicate the presence of an acceptably large range at 1.55 μm band, allowing for signal wavelength fluctuation depending on differences in light sources and the like.

Further, when output of this fixed attenuator was directly received by an optical detector and measured, optical attenuation of substantially the same value as that measured through the optical fibers was obtained and it was stable.

Moreover, as a simulation of a condition where cladding mode is likely to occur, a similar test was performed by connecting both ends of the fixed attenuator of FIG. 3 to optical fibers which had been subjected to a dispersion treatment of the core and whose mode field diameter at the end of the connector was increased by 1.5 times. Also in this case, wavelength dependency of attenuation remained stable, though attenuation was changed due to increase of coupling loss, and it could be confirmed that the cladding mode was effectively reduced.

In the manufacture of optical fibers of the third embodiment, the region to be doped with an attenuating dopant may be small since the region of the inner cladding 2 is small. In addition, conventional techniques for doping F into the low refractive index portion 10 and for producing the basic components of the optical fibers can be used as Therefore, the optical fiber of the third embodiment can be manufactured at a cost lower than the cost for the conventional ones having a cladding which is doped throughout with an attenuating dopant.

As explained above, in the optical fiber of the third embodiment of the present invention, optical signals radiated from the core 1 into the inner cladding 2 are confined to propagation in the inner cladding 2 by providing a layer having a thickness of 15 μm and doped uniformly with F (fluorine) to provide a substantially constant relative refractive-index difference of −0.15% in the low refractive index portion 10 outside the inner cladding 2. At the same time, by substantially uniformly doping the core 1 and the inner cladding 2 with Co as a dopant, propagated optical signals are attenuated by the Co dopant. Thus, the influence of the cladding mode can be reduced. That is, cladding mode can be effectively reduced by local doping of the inner cladding 2, instead of doping of the whole optical fiber for optical attenuation.

In addition, not only because doping of the whole optical fiber for optical attenuation is not needed, but also because the content of the dopant does not need to be increased, optical fibers for optical attenuation can be produced at a low cost.

In the third embodiment of the optical fiber of the present invention, the refractive indices of the core 1 and the inner cladding 2 were not substantially changed by the doping with Co. Therefore, coupling characteristics such as reflection characteristic advantageously suffer no influence from the doping.

The method for varying the relative refractive-index difference of the outer side of the inner cladding 2, i.e., inner side of the outer cladding 3, has already become a conventional method and therefore conventional apparatuses for manufacturing optical fibers can advantageously used. Moreover, because the region where the relative refractive-index difference is changed is small, optical fibers for optical attenuation can be produced at a further lowered cost.

In the above explanation of the third embodiment, the dopant for optical attenuation doped into the core 1 or into the vicinity of the core 1 was a single dopant. However, the attenuating dopant doped in the core 1 or in the vicinity of the core 1 serves to control the basic characteristics of optical attenuation and therefore, of course, is not limited to one kind of dopant.

As to the attenuating dopant doped into the inner cladding 2, two or more dopants such as Cr (chromium) and V (vanadium) may be used, for example, when intended wavelength bands and/or fiber parameters are varied, since it is not necessary to expand the doped region.

EXAMPLE 6

FIG. 11 is a cross-sectional view of an example of the optical fiber for optical attenuation according to the third embodiment of the present invention, which view shows the refractive index distribution. The optical fiber includes an optical attenuation dopant region 9.

In FIG. 11, the optical attenuation dopant region 9 was a region doped with, for example, Co, and it was a region of the inner cladding 2 directly adjacent to the core 1. The core 1 of the optical fiber of this example was also doped with Co, in addition to $GeO_2$ as in Example 5. That is, the optical fiber of this example had a region corresponding to the region for optical attenuation in Example 5 wherein dopant was incorporated into the inner cladding 2.

As described in Example 5, in the inner cladding 2, the optical attenuation dopant region 9 doped with Co and the region not doped with Co were not substantially different from each other in their refractive index distributions and, therefore, the refractive index distribution shown in FIG. 11 could be obtained.

Also, as seen in the refractive index distribution shown in FIG. 11, the core had the highest refractive index. The fiber included core 1, the inner cladding 2, the optical attenuation dopant region 9 adjacent the core 1, a low refractive index portion 10 having a refractive index lower than that of the inner cladding 2 exterior to the inner cladding 2 and outer cladding 3.

Therefore, as in the optical fiber for optical attenuation of Example 5 described above, optical signals entering the inner cladding 2 are confined to and attenuated within the optical attenuation dopant region 9. Accordingly, the optical fiber exerts the same attenuation effect as in the optical fiber of Example 5. In addition, because the region doped with the dopant can be made small, it can be produced at a cost yet lower than that of the optical fiber of Example 5.

Though the whole core 1 was doped with the dopant in this example, of course, only a portion need be doped like portion 9 in the inner cladding 2.

Comparative Example 3

As a comparison with Example 5 (third embodiment), an optical fiber for optical attenuation whose core had the same structure as the optical fiber of Example 5 and whose cladding was made of pure quartz glass, i.e., not doped with $GeO_2$, was prepared. A similar test was performed using an optical attenuator of the SC type comprising the obtained optical fiber.

In this case, in order to obtain optical attenuation of 30 dB with a length of 22 mm, the amount of Co doped in the core had to be larger than those amounts used in the optical fibers of Examples 5 and 6.

Results of the measurement of wavelength dependency of attenuation, in particular, at 1.55 μm band, obtained by using the optical attenuator of SC type prepared above are shown in FIG. 12.

The wavelength dependency of attenuation showed periodically varying peaks of a magnitude as large as +5 dB and, from these results, it was confirmed that attenuation was significantly changed by a small change in the wavelength. Further, optical signals sometimes could not propagate properly due to coupling of the cladding mode.

Thus, it was revealed that cladding mode can be eliminated more effectively by using the optical fiber shown in FIG. 9 according to the third embodiment of the present invention.

In the above explanations of the first to third embodiments (Examples 1 to 6), only attenuators for high attenuation have been described. However, the advantage of the present invention can be obtained in attenuators for low attenuation. In particular, when optical fibers having different mode field diameters are used and coupled, or when a plurality of optical attenuators are used and coupled in series, the advantage of the present invention would be remarkable.

Further, in the above explanations of the first to third embodiments (Examples 1 to 6), only optical attenuators for single mode optical fibers have been described. However, the advantage of the present invention can of course be obtained in attenuators for multimode optical fibers and filters for single mode and multimode optical fibers. In addition, depending on the use, the advantage can of course be expected for optical fibers made of a material other than quartz glass.

Further the optical fiber of the invention can be applied to a terminator of simple structure because the reflected optical power is attenuated effectively merely by using the optical fiber, without any special end-treatment.

Of course, the kind, amount, doping method and the like of the dopant for the optical fiber of the present invention are not limited to those described in the above examples.

The present invention has been specifically explained by the reference to the working examples mentioned above, but the present invention is not limited to the examples and various modifications and alterations can of course be made within the scope of the present invention.

If the invention is applied to a fiber with a normal core doped with any attenuative material or to a fiber with any attenuative structure, the fiber functions as the mode filter which effectively attenuates only the cladding propagation mode.

The typical advantages of the present invention can be summarized as follows:

(1) The cladding mode can be effectively reduced without affecting the attenuating characteristics of the optical attenuators (first and second embodiments).

(2) Optical fibers having excellent optical attenuation characteristics and stability can be produced at a low cost.

(3) Because a portion for trapping the cladding mode is provided in the fiber at a location sufficiently remote from the core, the mode field shape of the basic mode is not altered when refractive index of the trapping portion is changed and the basic characteristics such as attenuation wavelength characteristic of the optical attenuator is not altered when an attenuating dopant is added to the trapping portion. Therefore, the characteristics of optical attenuation can be controlled merely by providing certain structures around the core (first and second embodiments).

(4) Because the refractive index of the cladding in the vicinity of the core is unchanged, coupling characteristics such as reflection characteristic are not affected.

(5) Because the portion for trapping the cladding mode need not need be the whole cladding and the desired effect can be obtained merely by changing the relative refractive-index difference, the cladding can be produced using only a conventional apparatus (first and second embodiments).

(6) If attenuating dopants are added, the doping region and amount need not be large. Therefore, the cost of the attenuating optical fibers can be reduced.

What is claimed is:

1. An optical attenuator for attenuation of intensity of optical signals, said optical attenuator including an optical fiber attenuator comprising:
   a core having a first refractive index;
   a cladding including:
      a first cladding portion adjacent to and surrounding said core and having a second refractive index lower than said first refractive index; and
      a second cladding portion surrounding said first cladding portion and having a third refractive index higher than said second refractive index; and
   at least one attenuation dopant for significantly attenuating the intensity of optical signals, said attenuating dopant being incorporated into at least one of said core and said first cladding portion.

2. The optical attenuator of claim 1 wherein said cladding additionally includes another dopant for increasing refractive index only in said second cladding portion.

3. The optical attenuator of claim 2 wherein said second cladding portion additionally contains said attenuation dopant.

4. The optical attenuator of claim 3, wherein said another dopant is $GeO_2$ and said attenuation dopant is Co.

5. The optical attenuator of claim 2 wherein the concentration of said another dopant increases radially outward and gradually across said second cladding portion.

6. The optical attenuator of claim 1 wherein said core contains said attenuation dopant and another dopant for increasing said first refractive index.

7. The optical attenuator of claim 6 wherein said attenuation dopant is Co and said another dopant is $GeO_2$.

8. The optical attenuator of claim 1 additionally including a zirconia ferrule coextensive with the length of said optical fiber attenuator.

9. The optical attenuator of claim 8 additionally including means for applying uniform radial pressure to said ferrule.

10. The optical attenuator of claim 1, wherein a part or the whole of said second cladding portion is doped with an attenuation dopant for attenuating the intensity of optical signals.

11. The optical attenuator of claim 1 wherein said attenuation dopant is Co.

12. The optical attenuator of claim 1 additionally including at least one optical fiber coupled to an end of said optical fiber attenuator.

13. The optical attenuator of claim 1 wherein said dopant provides 20–30 dB of attenuation of an optical signal of a wavelength of 1.3 μm per 22.4 μm length of said optical fiber attenuator.

14. An optical attenuator for attenuation of intensity of optical signals, said optical attenuator including an optical fiber attenuator comprising:
   a core having a first refractive index;
   a cladding including:
      a first cladding portion adjacent to and surrounding said core and having a second refractive index lower than said first refractive index; and
      a second cladding portion surrounding said first cladding portion;
   at least a first attenuation dopant for significantly attenuating the intensity of optical signals, said first attenuating dopant being incorporated into at least one of said core and said first cladding portion; and
   at least a second attenuation dopant, for significantly attenuating the intensity of optical signals, incorporated into said second cladding portion.

15. The optical attenuator of claim 14 additionally including a zirconia ferrule coextensive with the length of said optical fiber attenuator.

16. The optical attenuator of claim 15 additionally including means for applying uniform radial pressure to said ferrule.

17. The optical attenuator of claim 14 additionally including at least one optical fiber coupled to an end of said optical fiber attenuator.

18. The optical attenuator of claim 14 wherein said first and second attenuation dopants are Co.

19. The optical attenuator of claim 14 wherein said dopant provides 20–30 dB of attenuation of an optical signal of a wavelength of 1.3 μm per 22.4 mm length of said optical fiber attenuator.

20. An optical attenuator for attenuation of intensity of optical signals, said optical attenuator including an optical fiber attenuator comprising:
   a core having a first refractive index;

a cladding including:
   a first cladding portion adjacent to and surrounding said core and having a second refractive index lower than said first refractive index; and
   a second cladding portion surrounding said first cladding portion, and
at least one attenuation dopant for significantly attenuating the intensity of optical signals, said attenuating dopant being incorporated into said first cladding portion.

21. The optical attenuator of claim 20 additionally including a zirconia ferrule coextensive with the length of said optical fiber attenuator.

22. The optical attenuator of claim 21 additionally including means for applying uniform radial pressure to said ferrule.

23. The optical attenuator of claim 20 wherein said one attenuation dopant is Co.

24. The optical attenuator of claim 20 wherein said dopant provides 20–30 dB of attenuation of an optical signal of a wavelength of 1.3 μm per 22.4 mm length of said optical fiber attenuator.

25. The optical attenuator of claim 20 wherein said second cladding has a third refractive index less than said second refractive index.

26. The optical attenuator of claim 20 additionally including at least one optical fiber coupled to an end of said optical fiber attenuator.

* * * * *